(12) United States Patent
Anderson et al.

(10) Patent No.: US 8,986,798 B2
(45) Date of Patent: *Mar. 24, 2015

(54) MATERIAL FOR ATTENUATING IMPACT ENERGY

(71) Applicant: 9Lives LLC, San Francisco, CA (US)

(72) Inventors: Erik Christian Anderson, San Francisco, CA (US); Henry Lee Turlington, Jr., Calabasas, CA (US); Wilhelm Oehl, San Francisco, CA (US); Timothy Matthew Kobe, Hillsborough, CA (US); Richard Mark Greenwald, Norwich, VT (US)

(73) Assignee: 9Lives, LLC, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/959,113

(22) Filed: Aug. 5, 2013

(65) Prior Publication Data

US 2013/0313765 A1 Nov. 28, 2013

Related U.S. Application Data

(62) Division of application No. 12/946,811, filed on Nov. 15, 2010, now Pat. No. 8,524,338.

(60) Provisional application No. 61/261,544, filed on Nov. 16, 2009, provisional application No. 61/261,568, filed on Nov. 16, 2009, provisional application No. 61/261,613, filed on Nov. 16, 2009.

(51) Int. Cl.
*A42B 3/12* (2006.01)
*A41D 13/015* (2006.01)
*F16F 7/01* (2006.01)

(52) U.S. Cl.
CPC .......... *A41D 13/0155* (2013.01); *A41D 13/015* (2013.01); *A42B 3/12* (2013.01); *A42B 3/125* (2013.01); *F16F 7/01* (2013.01)
USPC ................... 428/34.1; 383/9; 383/19; 383/26

(58) Field of Classification Search
CPC ...... A41D 13/00; A42C 2/005; F41H 5/0471; F41H 5/0478; F41H 5/0485
USPC .................................. 428/34.1; 383/9, 19, 26
See application file for complete search history.

(56) References Cited

U.S. PATENT DOCUMENTS

| 3,459,179 A | 8/1969 | Olesen |
|---|---|---|
| 3,552,044 A | 1/1971 | Wiele |

(Continued)

FOREIGN PATENT DOCUMENTS

| GB | 2427249 B | 2/2010 |
|---|---|---|
| GB | 2470180 A | 11/2010 |

(Continued)

OTHER PUBLICATIONS

Davies, K. et al., Pedestrian Protection Using a Shock Absorbing Liquid (SALi) Based Bumper System, National Highway Traffic Safety Administration (NHTSA), International Technical Conference on the Enhanced Safety of Vehicles (ESV), Jun. 14-18, 2009 International Congress Center, Stuttgart, Germany Paper No. 09-0027.

*Primary Examiner* — Brent O'Hern
(74) *Attorney, Agent, or Firm* — Barlow, Josephs & Holmes, Ltd.

(57) ABSTRACT

A new and novel impact energy attenuation material, impact energy attenuation module employing the material and a fit system for optimizing the performance thereof is provided. Non-linear energy attenuating material consisting of a plurality of loose particles is employed for impact energy dissipation. The loose particles are preferably spherical elastomeric balls. An impact energy attenuation module includes a container that holds the loose particles. The impact energy attenuation module can be provided in a wide range of sizes and shapes and the loose particles can be provided in different materials, sizes, density, compaction and hardness to suit with the application at hand. A matrix of impact energy attenuation module are provided about the surface of a shell to provide the required impact energy attenuation. The material, impact energy attenuation module and system of the present invention are well suited for protection of body parts and other cushioning and protection needs.

10 Claims, 26 Drawing Sheets

(56) References Cited

U.S. PATENT DOCUMENTS

| | | |
|---|---|---|
| 3,574,379 A | 4/1971 | Jordan |
| 3,610,609 A | 10/1971 | Sobel |
| 3,782,768 A | 1/1974 | Moore |
| 4,023,213 A | 5/1977 | Rovani |
| 4,038,762 A | 8/1977 | Swan, Jr. |
| 4,148,505 A | 4/1979 | Jensen et al. |
| 4,229,546 A | 10/1980 | Swan, Jr. |
| 4,307,471 A | 12/1981 | Lovell |
| 4,342,157 A | 8/1982 | Gilbert |
| 4,343,047 A | 8/1982 | Lazowski et al. |
| 4,354,284 A | 10/1982 | Gooding |
| 4,817,304 A | 4/1989 | Parker et al. |
| 5,053,436 A | 10/1991 | Delgado |
| 5,079,787 A | 1/1992 | Pollmann |
| 5,141,279 A | 8/1992 | Weller |
| 5,330,249 A | 7/1994 | Weber et al. |
| 5,421,874 A | 6/1995 | Pearce |
| 5,456,072 A | 10/1995 | Stern |
| 5,508,334 A | 4/1996 | Chen |
| 5,549,743 A | 8/1996 | Pearce |
| 5,590,430 A | 1/1997 | Sereboff |
| 5,592,706 A | 1/1997 | Pearce |
| 5,689,845 A | 11/1997 | Sobieralski |
| 5,790,988 A | 8/1998 | Guadagnino, Jr. et al. |
| 5,815,846 A | 10/1998 | Calonge |
| 5,921,004 A | 7/1999 | Lyden |
| 5,956,777 A | 9/1999 | Popovich |
| 6,153,698 A | 11/2000 | Kanno et al. |
| 6,154,889 A | 12/2000 | Moore, III et al. |
| 6,197,099 B1 | 3/2001 | Pearce |
| 6,226,801 B1 | 5/2001 | Alexander et al. |
| 6,226,896 B1 | 5/2001 | Friton |
| 6,282,724 B1 | 9/2001 | Abraham et al. |
| 6,292,954 B1 | 9/2001 | O'Bradaigh et al. |
| 6,324,700 B1 | 12/2001 | McDougall |
| 6,336,220 B1 | 1/2002 | Sacks et al. |
| 6,347,790 B1 | 2/2002 | Nishibori et al. |
| 6,357,054 B1 | 3/2002 | Bainbridge et al. |
| 6,425,141 B1 | 7/2002 | Ewing et al. |
| 6,438,763 B2 | 8/2002 | Guay et al. |
| 6,446,270 B1 | 9/2002 | Durr |
| 6,453,476 B1 | 9/2002 | Moore, III |
| 6,453,477 B1 | 9/2002 | Bainbridge et al. |
| D465,067 S | 10/2002 | Ide et al. |
| 6,481,024 B1 | 11/2002 | Grant |
| 6,485,446 B1 | 11/2002 | Brother et al. |
| 6,487,796 B1 | 12/2002 | Avar et al. |
| 6,509,385 B2 | 1/2003 | Sereboff |
| 6,532,602 B2 | 3/2003 | Watters et al. |
| 6,552,109 B1 | 4/2003 | Chen |
| 6,560,787 B2 | 5/2003 | Mendoza |
| D475,486 S | 6/2003 | Ide et al. |
| 6,583,199 B2 | 6/2003 | Brother et al. |
| 6,604,246 B1 | 8/2003 | Obreja |
| 6,658,671 B1 | 12/2003 | Von Holst et al. |
| 6,756,426 B2 | 6/2004 | Brother et al. |
| D492,818 S | 7/2004 | Ide et al. |
| 6,802,307 B2 | 10/2004 | Leven |
| 6,826,852 B2 | 12/2004 | Fusco |
| 6,854,133 B2 | 2/2005 | Lee et al. |
| 6,857,151 B2 | 2/2005 | Jusiak et al. |
| 6,931,671 B2 | 8/2005 | Skiba |
| 6,934,971 B2 | 8/2005 | Ide et al. |
| 6,996,856 B2 | 2/2006 | Puchalski |
| 7,033,666 B2 | 4/2006 | Skaja |
| 7,056,564 B2 | 6/2006 | Sereboff |
| 7,062,795 B2 | 6/2006 | Skiba et al. |
| 7,089,602 B2 | 8/2006 | Talluri |
| 7,096,512 B2 | 8/2006 | Blair |
| 7,131,218 B2 | 11/2006 | Schindler |
| 7,240,376 B2 | 7/2007 | Ide et al. |
| 7,254,843 B2 | 8/2007 | Talluri |
| 7,284,469 B2 | 10/2007 | Raichel et al. |
| 7,299,505 B2 | 11/2007 | Dennis et al. |
| 7,314,125 B2 | 1/2008 | Smaldone et al. |
| 7,328,462 B1 | 2/2008 | Straus |
| 7,341,776 B1 | 3/2008 | Milliren et al. |
| 7,373,678 B2 | 5/2008 | Hetzel et al. |
| 7,386,946 B2 | 6/2008 | Goodwin |
| 7,448,522 B2 | 11/2008 | Collier et al. |
| 7,458,172 B2 | 12/2008 | Aveni |
| 7,591,919 B2 | 9/2009 | Schindler et al. |
| 7,685,742 B2 | 3/2010 | Aveni et al. |
| 7,685,743 B2 | 3/2010 | Swigart et al. |
| 7,694,439 B2 | 4/2010 | White et al. |
| 7,730,635 B2 | 6/2010 | Aveni et al. |
| 7,757,410 B2 | 7/2010 | Aveni et al. |
| 7,762,432 B2 | 7/2010 | Fidrych et al. |
| 7,798,298 B2 | 9/2010 | Smaldone et al. |
| 2002/0152541 A1 | 10/2002 | Halstead et al. |
| 2003/0200609 A1* | 10/2003 | Jusiak et al. ............... 5/655.4 |
| 2004/0025229 A1 | 2/2004 | Takahashi et al. |
| 2005/0166302 A1 | 8/2005 | Dennis |
| 2006/0137073 A1 | 6/2006 | Crisco |
| 2007/0083965 A1 | 4/2007 | Darnell et al. |
| 2009/0175499 A1 | 7/2009 | Rosenblatt |

FOREIGN PATENT DOCUMENTS

| | | |
|---|---|---|
| WO | 9725551 | 7/1997 |
| WO | 9949236 | 9/1999 |
| WO | 0111999 A1 | 2/2001 |
| WO | 0221013 A1 | 3/2002 |

* cited by examiner

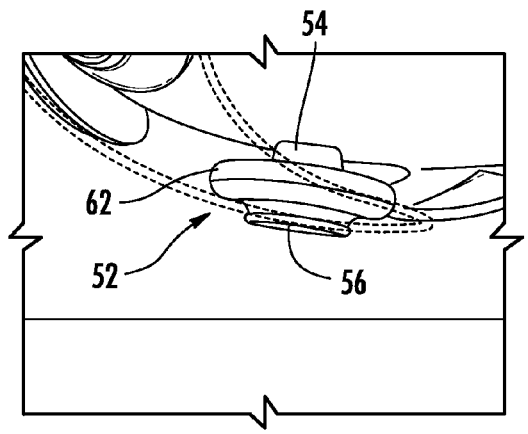
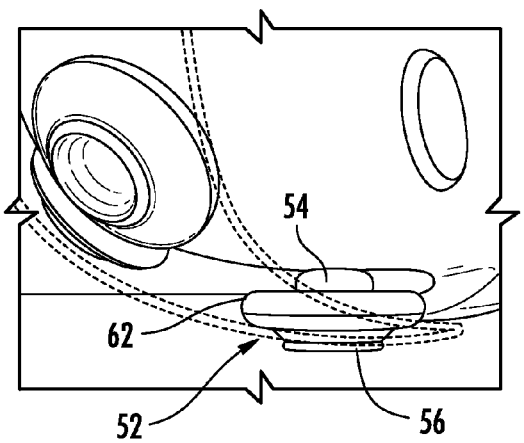
FIG. 23A    FIG. 23B
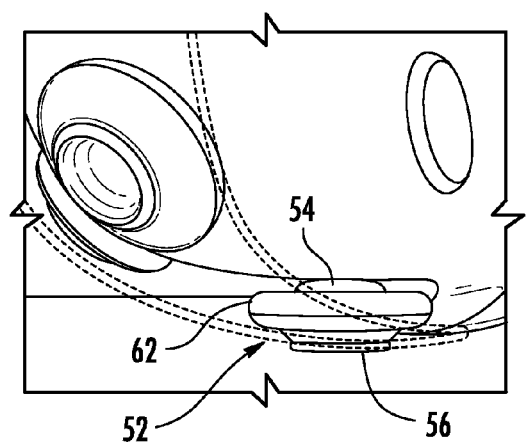
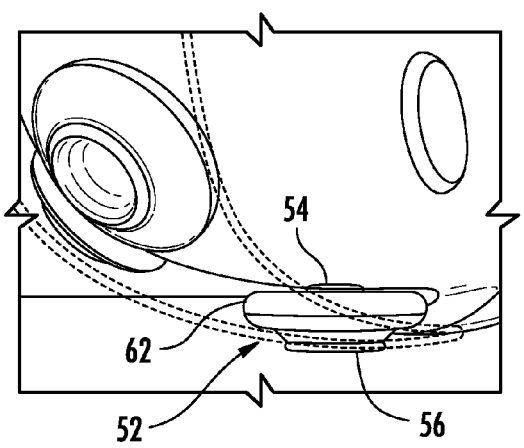
FIG. 23C    FIG. 23D

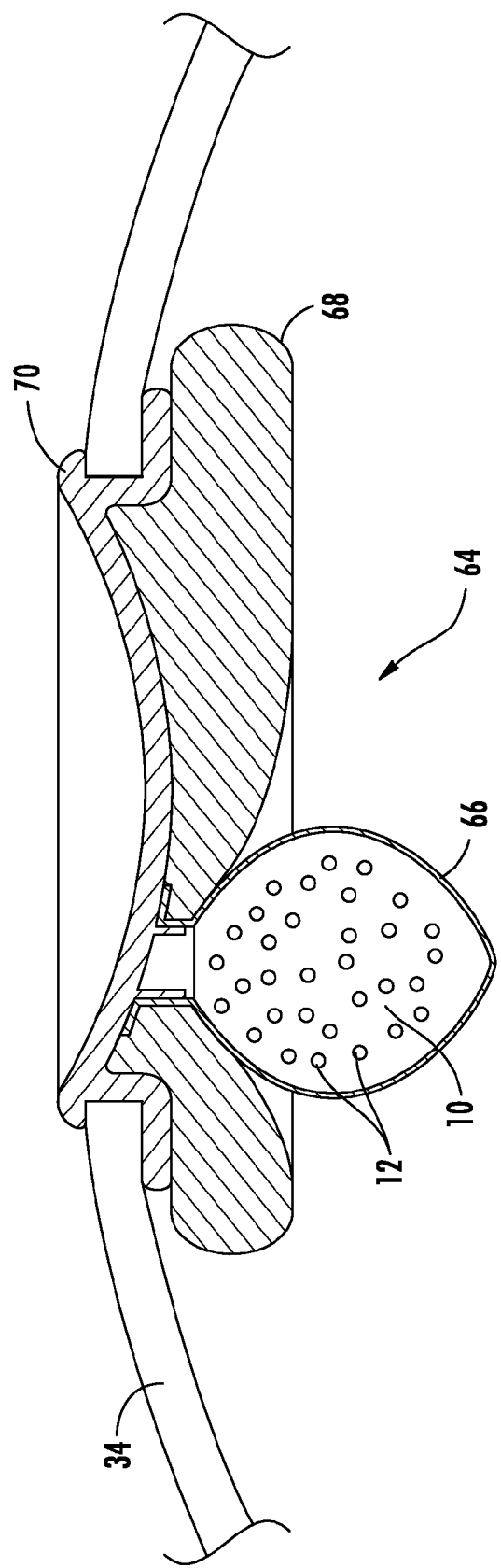

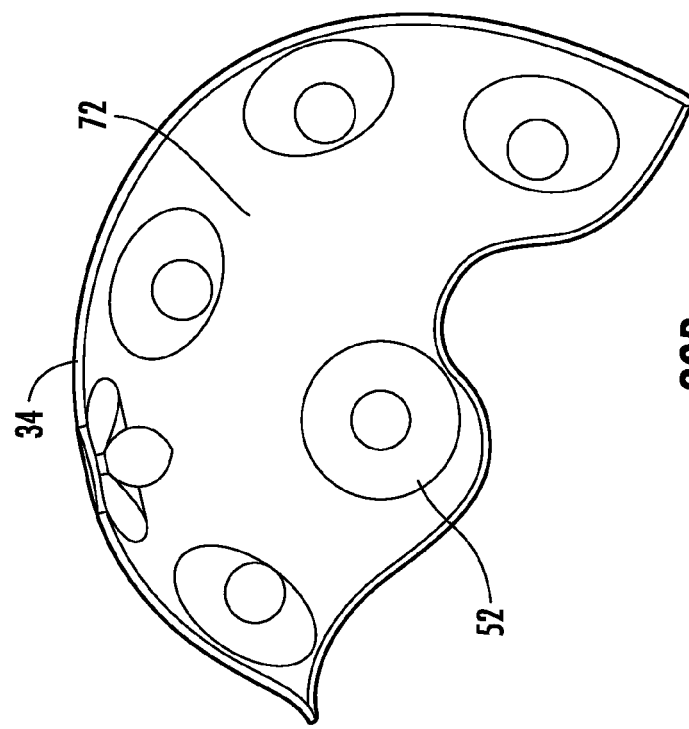
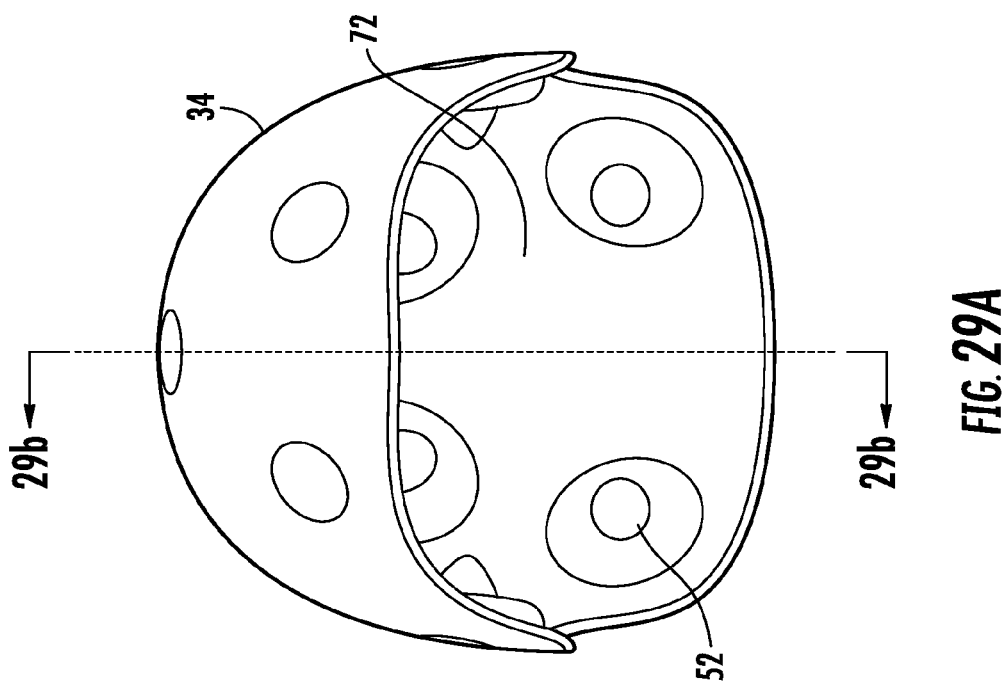

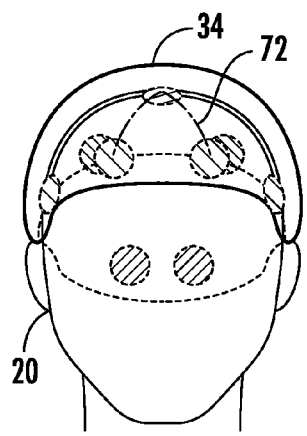 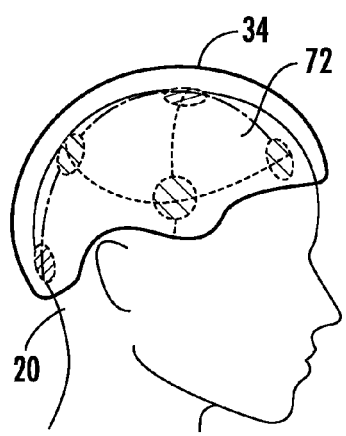 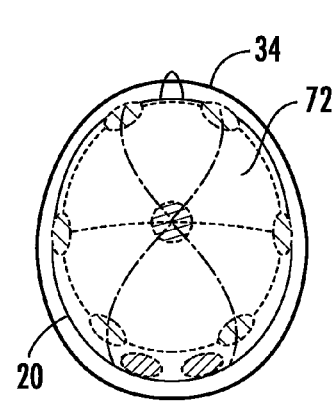
FIG. 33B  FIG. 33C  FIG. 33D
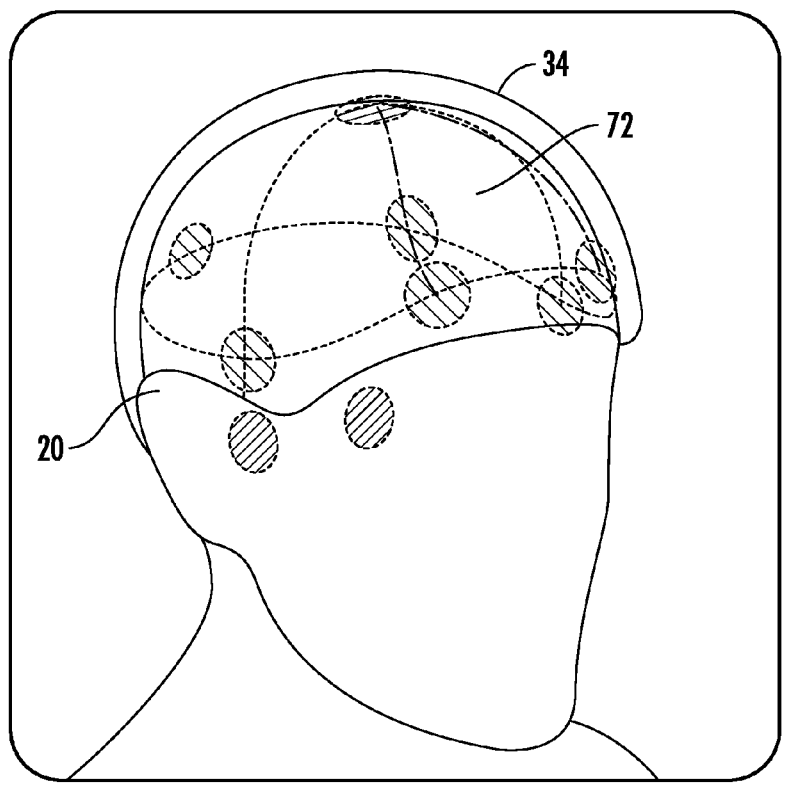
FIG. 33A

MATERIAL FOR ATTENUATING IMPACT ENERGY

CROSS REFERENCE TO RELATED APPLICATION

This application is divisional continuation of non-provisional patent application Ser. No. 12/946,811, filed on Nov. 15, 2010, which is related to and claims priority from earlier filed provisional patent application Ser. No. 61/261,544, filed Nov. 16, 2009; provisional patent application Ser. No. 61/261,568, filed Nov. 16, 2009, provisional patent application Ser. No. 61/261,613, filed Nov. 16, 2009 the entire contents of each of the foregoing are incorporated herein by reference.

BACKGROUND OF THE INVENTION

The present invention generally relates to impact energy attenuation, and particularly to padding and cushioning systems intended to reduce trauma resulting from impacts to parts of the body, such as the head. Moreover, the present invention relates the general personal protection field, in general, which includes helmets, pads, armor, sports gear, clothing, worker safety equipment, packaging, vehicle interiors, barriers and pads for threat objects, and the like.

The present invention relates to a new and novel way to attenuate impact energy using loose particles contained in resilient structures while being arranged and customized to optimize such attenuation of energy.

For ease of discussion and illustration, the present invention will be illustrated and discussed in detail in connection with the field of personal protection, namely, helmets. This is just one example of the many applications of the present invention. It should be understood that this in no way intended to limit the scope of the present invention.

In the field of personal protection, protective gear for professional and recreational athletes, sport enthusiasts, military personnel and construction workers are well known in the art. There are many approaches to reducing impact energies transferred to the user during an impact. As can be well understood, protection of the head is of high concern due to the risk of head trauma and other serious injuries. Therefore, protection of the head is of critical importance.

In the prior art, helmets are well known to protect a users head from skull fractures and other such trauma. This was accomplished primarily by some type of rigid outer shell. Over time, padding was added to replace webbing based suspension systems. Although padding has improved, these prior art systems still have significant problems and suffer from many disadvantages. One typical shortcoming of prior art helmet protection systems is inadequate protection over a range of impact energies typically encountered in activities they were intended for. Another typical shortcoming of the prior art is their inability to significantly reduce rotational (off axis) impact energies. Another typical shortcoming of the prior art is their inability to consistently fit a large range of users head shapes and sizes. Another typical shortcoming of the prior art is using impact energy attenuation systems designed for adult helmet systems in children's and youth helmets.

There are many types of helmets provided in the prior art in an attempt to address the foregoing concerns and shortcomings in prior art helmet design. Contact sports such as American football, hockey and lacrosse have developed and refined helmet types suited to the play of those sports while decreasing head injuries. Similarly, climbing helmets, snow sports helmets motor sports helmets and bike helmets have evolved and are widely worn by recreational and professional users. A majority of these helmets employ a rigid or semi-rigid shell. It is understood in the art, that a hard shell protects the skull from fracture and distributes the impact energy over a larger area. Most bike helmets utilize expanded polystyrene material for their construction. This approach to the shell/padding allows for a light weight, affordable product.

In addition, most helmets have fit systems allowing the user to adjust the size of the helmet to better fit their head. Fit is known to have a large impact on the efficacy of any helmet system by maintaining coverage during a potential impact situation. Rigid shell systems are challenged to provide an optimal fit given the range of human head shapes and sizes. Many prior art helmets use pads of the same thickness throughout and typically result in either loose areas, tight areas or both when fitted to a users head. Helmets that use foam pad systems, for example, may have areas that fit tightly and since the foam in those areas is overly compressed, impact mitigation is compromised. Conversely, loose areas do not benefit from additional protection afforded by that dimension. Expanded polystyrene (EPS) bike helmets, for example, are rigid throughout where the shell and pad system are one and the same. As a result, they offer little or no ability to establish an optimal fit.

Still other systems include air bladders, which can be filled to occupy voids between the users head and the shell. Still other systems use variable length head bands that can be adjusted to fit the circumference of the users head. Variable length head bands leave potentially large voids between the band and the shell. User applied low durometer foam pads are also well know to adjust fit, but do little to attenuate impact energy.

In addition, most helmets employ a retention system to ensure the helmet stays properly aligned on the users head. These are typically webbing straps, sometimes including a cup or other interface for the users chin.

As indicated above, all of the forgoing issues also relate to any type of protective equipment and devices and not limited to those that are intended to protect the body. Therefore, the same issues are of concern outside of the field of the personal body protection, of which the present invention is also related and has applicability.

Referring specifically now to padding, there are many known systems, a number of which are discussed below. One common approach for padding in the prior art is the use of foam materials. Foam materials are based on a manufacturing process that creates an open matrix structure from a plastic compound. There are of two primary types, namely, open cell and closed cell. Open cell materials rely on the structure of the matrix and elastomeric qualities of the plastic material to provide a dampening effect to impact energies. Closed cell materials augment the inherent structure with air contained in the cells thus storing some of the impact energy by compressing the air. This stored energy in padding systems intended for helmets is generally not preferred because it can cause further trauma to the user. One disadvantage to these materials is their narrow band of responsiveness to the typical range of impact energies. Another disadvantage to these materials is their inability to provide an optimal fit for a wide range of user sizes.

In the current art, one approach to padding is rate sensitive materials, which are very well known. These materials use a range of chemical and/or mechanical means to increase the material's density as the force of impact increases. Under normal conditions these materials are soft, but stiffen when impacted to distribute and absorb impact energy. One disadvantage to these materials is their slow rate of return to normal once compressed which makes them less suitable to multi-impact applications.

Another approach to padding is mechanical materials. These materials combine the inherent energy diffusing qualities of plastic compounds with unique structures such as tubes, domes, channels, etc. One disadvantage to these materials is the narrow band of responsiveness to impact energies. Another disadvantage to these materials is the high degree of stored energy they deliver back through the system after an initial impact.

Another approach to padding is gel materials. These materials generally combine viscous liquids with solid particles and can range from loose to stiff. Like rate sensitive materials, one disadvantage to these materials is their slow rate of return to normal once compressed which makes them less suitable to multi-impact applications. Another disadvantage to these materials is their narrow band or responsiveness to the typical range of impact energies.

Another approach to padding is EPS, mentioned above, often found in bike helmets. These materials are lightweight amalgams of foamed polystyrene beads, which are typically molded into rigid or semi-rigid structures. Impact energy is diffused when the structure dis-integrates upon impact. One disadvantage to these materials is their reliance on dis-integration, which makes them unsuitable to multi-impact applications. Another disadvantage to these materials is the difficulty in knowing if they have been compromised or damaged.

Another approach to padding is expanded polypropylene (EPP). These materials are lightweight amalgams of foamed poly propylene beads, which are typically molded into semi-rigid structures. Impact energy is diffused similarly to a closed cell foam material. One disadvantage to these materials is their inherent capacity to store impact energy and return it to the user's head as a rebound impact.

Yet another approach to padding is the use of air. Two approaches are currently in use in the prior art. First is air contained within a closed system, either in static bags or coupled bags that allow for the air to be transferred from bag to bag. The other uses an orifice to control the rate air is expelled. One disadvantage to these systems is their slow rate of return to normal once compressed which makes them less suitable to multi impact applications.

Performance standards have been developed for some helmet types and other body protective equipment. Bicycle helmets, for example, are subject to US CSPC testing standards. Football helmets are subject to NOCSAE testing standards. Hockey helmets are subject to ASTM testing standards. These test standards have helped to ensure that the protective equipment meets minimum requirements for performance under specified input criteria and testing criteria regardless of brand or cost. While virtually all helmets commercially available pass their respective tests, user injuries with different mechanisms of injury persist across the board. Within the sports category, this may be due in part to participants' average size and weight increasing coupled with a drive to push themselves harder to be more competitive. Recent news coverage of the increase in concussive injuries in American football has raised the question whether current test standards are appropriate for that particular injury. Medical science is discovering new links between brain injuries and trauma mechanisms that are helping to inform better protection, and eventually improved testing standards.

Regardless of application, users are demanding lighter and lower profile helmets with more and more energy attenuation. Added weight creates fatigue in the user, but is also known to increase inertia to the head in collisions. Helmet wearers generally and young sport enthusiasts in particular resist high profile solutions for aesthetic reasons.

In view of the foregoing, there is a demand for a new and novel impact energy attenuation material.

There is a demand for an impact energy attenuation material that is more responsive than prior art materials.

There is a further demand for a new and novel system that can provide impact energy attenuation.

There is a further demand for a system that can provide a custom fit of such a system for optimal performance thereof.

SUMMARY OF THE INVENTION

The present invention preserves the advantages of prior art impact energy attenuation materials and systems related thereto. In addition, it provides new advantages not found in currently available materials and systems and overcomes many disadvantages of such currently available materials and systems.

The invention is generally directed to the novel and unique impact energy attenuation material, module therefor including a container and fit system for optimizing the performance thereof.

First, the present invention includes a non-linear energy attenuating material consisting of a plurality of loose particles. The invention provides an interaction between loose particles and the resultant impact energy dissipation. Like a ball thrown into a bean bag chair the loose particle material of this invention translates impact energy into heat through friction in a highly non-linear distribution. In a preferred embodiment, the loose particles are preferably approximately (0.1-3 mm) diameter spherical elastomeric balls. One benefit of an elastomeric material is a high coefficient of friction between the loose particles, which increases the effective energy attenuation. Another benefit of an elastomeric material is under peak load conditions ("bottoming out"), the loose particles themselves will inherently continue to diffuse impact energy.

Second, the present invention also provides an impact energy attenuation module that includes a container for the foregoing material of loose particles. This module is preferably deformable. The use of the impact energy attenuation module of the present invention enables a number of desirable outcomes to be achieved.

For example, it has been found that, starting from a spherical volume, which is neutral and symmetrical, the energy from an impact could be directed along an axis by altering the shape of the container. In the preferred embodiments of the present invention, these energy focusing shapes are preferably triangular or diamond shaped in cross section, however, it should be understood that other shapes can also be used to guide impact energy into a relatively large "pool" of impact energy attenuating material. By enclosing the loose particle material in a volume with such an energy focusing shape, the material's energy dissipation qualities are increased. As will described in detail below, a torus shaped configuration is particularly well-suited for the energy attenuation characteristics of the module of the present invention.

In one embodiment of the module, suited for use with a rigid shell or liner in an example of a helmet head protection device, the shape of the module is a preferably a hollow torus. A cross-section through the torus shows that it is wider at one end than the other or roughly triangular. This module would orient with the wider side facing towards the expected impact and the narrow side facing the head. This orientation provides a relatively large "pool" of impact dissipating material to absorb impact energy proximal to the shell. The small contact surface at the head allows relatively uninhibited flexure of the torus shape, allowing for the diffusion of rotational or off axis impacts. This small surface is also useful to create maximum air circulation/ventilation when the application is a helmet. It is possible that this torus configuration may be inverted or altered to better suit the environment and purpose of the impact energy dissipation at hand.

As part of the module, the container for the impact energy attenuating material can be made from any of a range of elastomeric polymers or other materials capable of sustaining multiple high energy impacts without failure across a range of environmental conditions. This impact energy attenuation and simultaneous rotational movement of the overall module structure gives the present invention a unique functionality to decrease the displacement, velocity and acceleration of the head in both linear and off axis impacts.

Further, the container for the material, including loose particles, provides a module that provides a degree of memory, returning the loose particles to their original or neutral state quickly after an initial impact thereby enabling the system for further impacts. The pad of the present invention can reset itself in a time period of approximately 50 milliseconds to approximately 5 seconds. This memory stores very little inertial energy thereby avoiding any negative effects associated with "spring back" of the module.

The efficacy of the impact dissipation material is partially dependent on the container portion of the module, which holds the material. Both the shape of the container and the material used for the container affect the overall system performance. How tightly the material is compressed in the container will also affect system performance and can be tuned to the particular application at hand. As can be understood, higher pressures applied to the loose particle compound by the container (either through overfilling or evacuation of air), slows the movement between particles during an impact, effectively hardening the material to mitigate higher impact forces. Lower pressures result in a softer material and mitigate lower impact forces.

Another feature of the present invention is to provide an optimal fit to the environment at hand. For example, in the example environment of a body protection helmet device, there is a need to custom fit that device the individual's head shape and size. The fit of a helmet relative to the head is understood in the field to reduce the severity of energy translated through the system, but is difficult to achieve using conventional means. For example, the range of head shapes and sizes when considering the fit of a helmet cannot be consistently fit using a single thickness of foam or a single size of pad. To ensure maximum energy dissipation, each pad installed in the system should preferably be partially compressed by height when fitted to the users head.

Still further, the present invention provides easily exchangeable modules to allow the user to replace damaged modules, increase or decrease the density of any module in the system, and or re-fit the helmet.

Also, the present invention provides the dissipation of impact energy from any angle of incidence. By enclosing the loose particle material in a container with a relatively small attachment member to a rigid shell or liner, the container is free to move or smear in line with the force, and thus not transfer those forces to the users head.

The present invention also provides dissipation of impact energies from multiple impacts. By enclosing the loose particle material in a container made from a resilient material with some degree of memory to form the impact energy attenuation module, the loose particles of the material is quickly reset after an initial impact and thus prepared for further impacts.

The present invention also dissipates equal impact energy in less volume compared to prior art materials Therefore, it is the object of this invention to provide a new and novel impact energy attenuation material.

An object of the present invention is to provide a material with an increased range of impact energy attenuation.

It is further the object of this invention to provide a material, module and system that can attenuate impact energy regardless of incidence angle of the impact.

It is further the object of this invention to provide a highly responsive system that can quickly reset in anticipation of multiple impacts.

It is further the object of this invention to provide a method for distributing impact energy attenuation within body protective equipment.

It is further the object of this invention to provide a method for distributing impact energy attenuation within a module that is inserted into body protective equipment.

It is further the object of this invention to provide a method for distributing impact energy attenuation within a helmet liner or helmet shell.

It is yet a further the object of this invention to ensure an optimal fit of body protective equipment.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 1b shows example stages of attenuation of impact energy achieved by the particles of FIG. 1a.

FIGS. 23a-d is a perspective view of the centered three-piece impact energy attenuation module in different levels of load;

FIG. 24. Is a cross-sectional view of the off center three piece embodiment of the impact energy attenuation module installed on a rigid shell;

FIGS. 29a-b illustrate a front perspective and side view of a helmet with centered impact energy attenuation modules installed thereon;

FIG. 33a-d illustrates a matrix array of preferred contact points; and

DETAILED DESCRIPTION OF THE PREFERRED EMBODIMENT

Figure 1A:
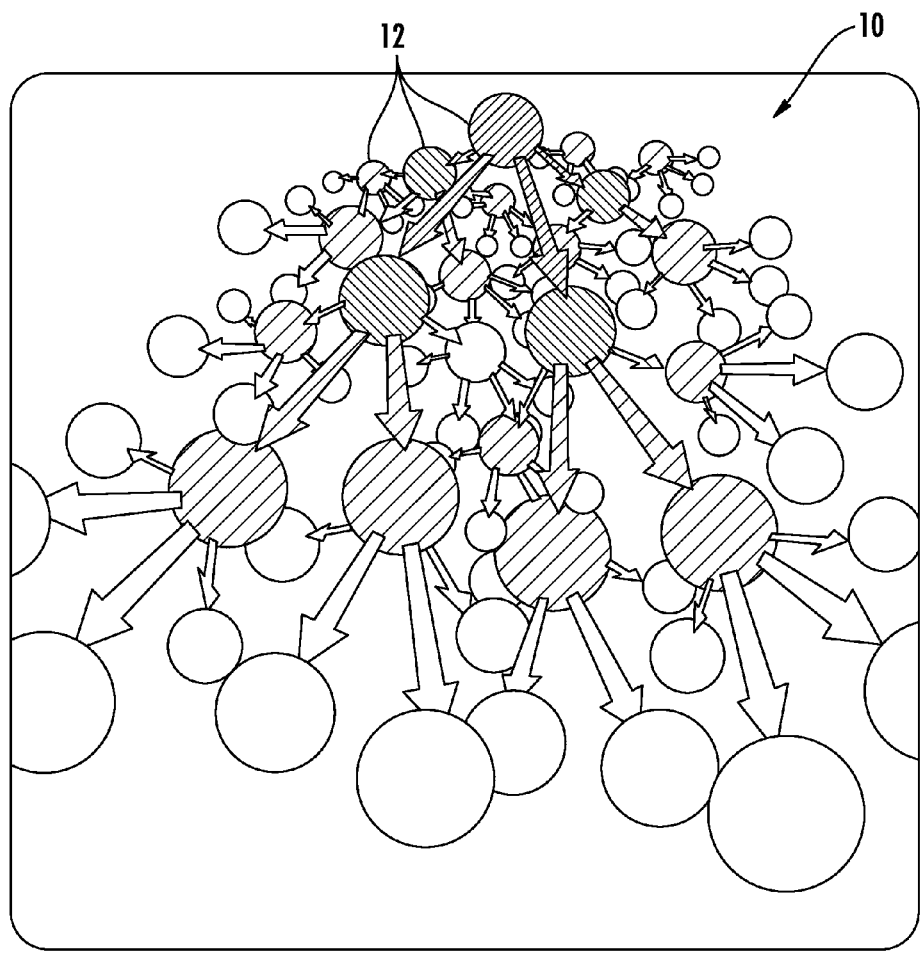
FIG. 1a is a perspective representational view of the interaction of the particles of the present invention.
Figure 1B:
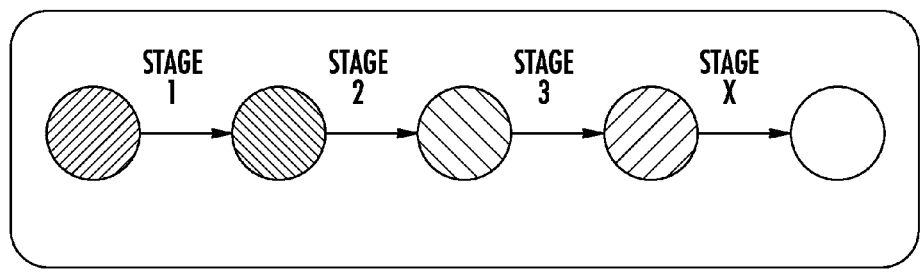

Turning first to FIG. 1, detail of the impact energy attenuation material 10 of the present invention is shown in detail. Preferably, this material, generally referred to as 10, is made up of a number of discrete particles 12. This loose particle material 10 may be solid plastic beads, hollow plastic beads, glass microspheres and ceramic microspheres. Depending on the application, larger or smaller particles 12 can be used. In a preferred embodiment, the loose particles 12 are preferably approximately 0.1-3 mm diameter spherical elastomeric balls. A mixture of sizes, shapes, and materials for the loose particles 12 is also possible. Further embodiments may include non-spherical particles 12 ranging from oval rounds to hard edged multi-hedron shapes (tetrahedrons, cubes, etc.). In the preferred embodiment, the durometer of the elastomeric particles 12 are preferably in the range of approximately Shore A 10 to approximately Shore A 100.

Figure 2A:
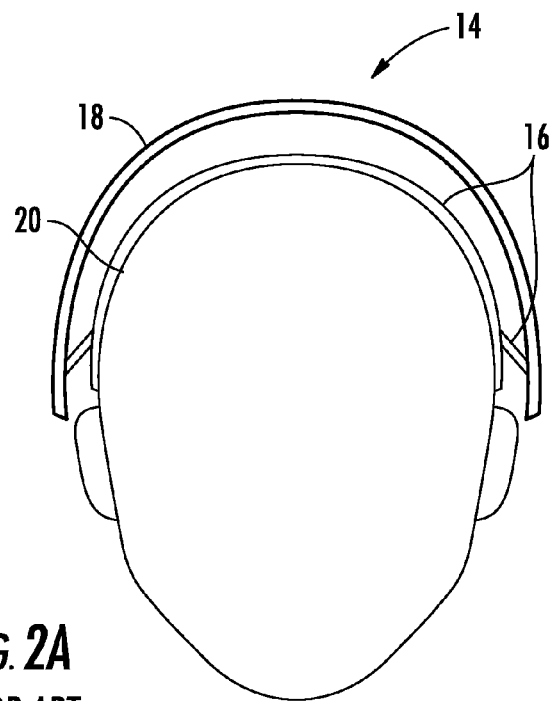
FIGS. 2a-f illustrate a number of prior art helmet configurations.
Figure 2B:
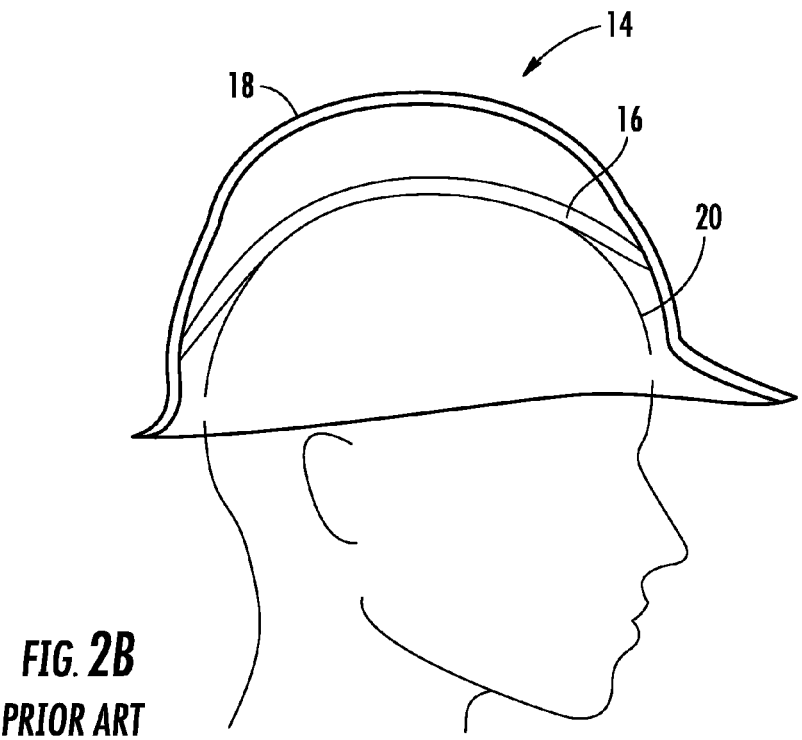
Figure 2C:
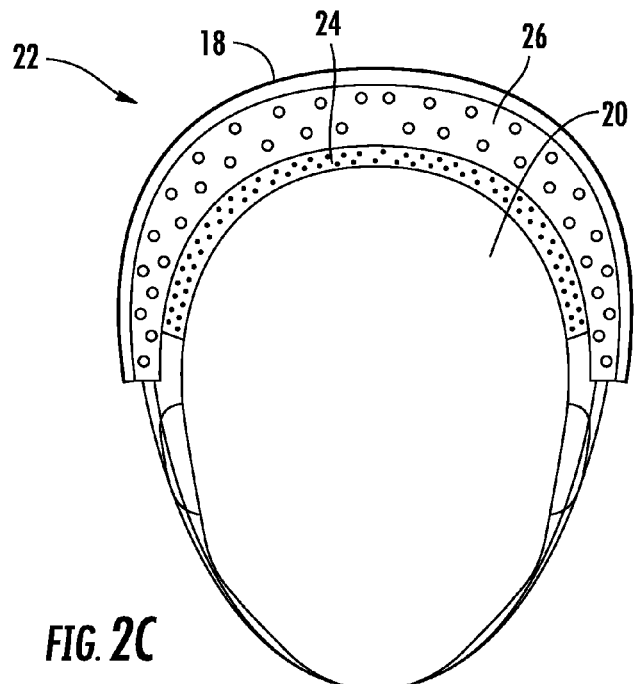
Figure 2D:
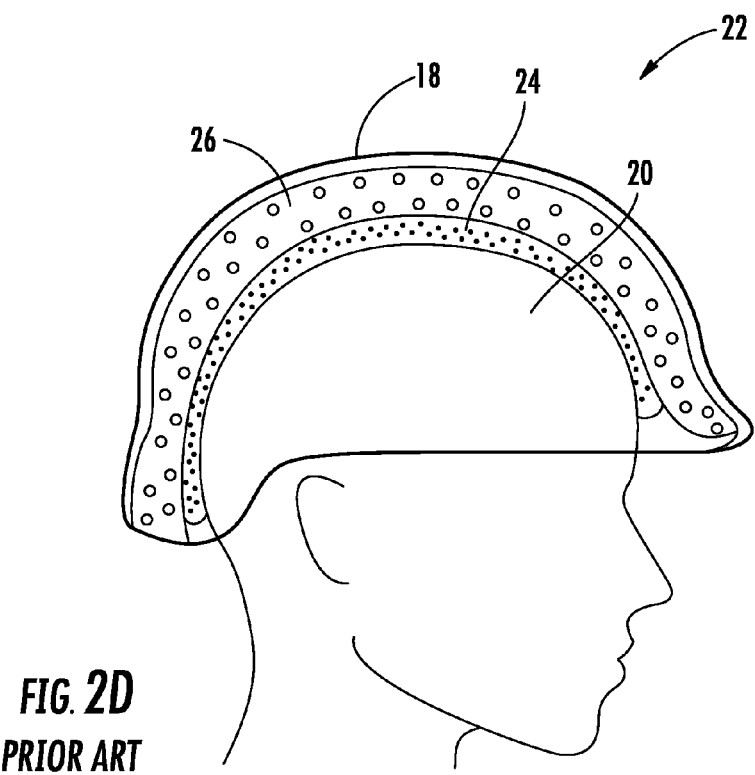
Figure 2E:
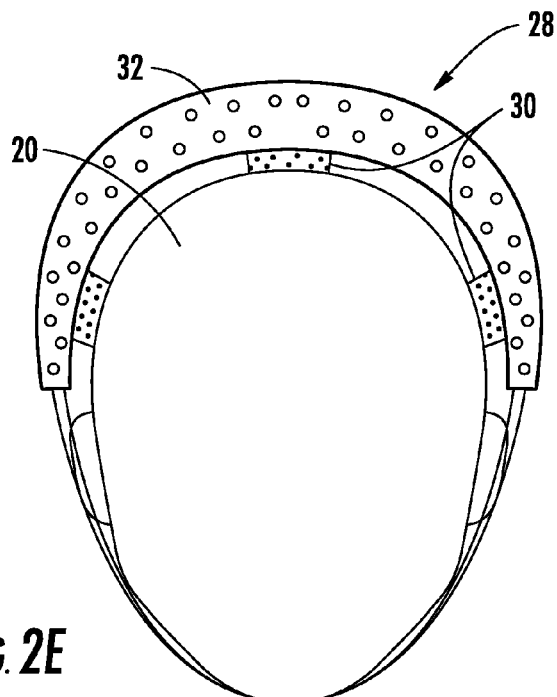
Figure 2F:
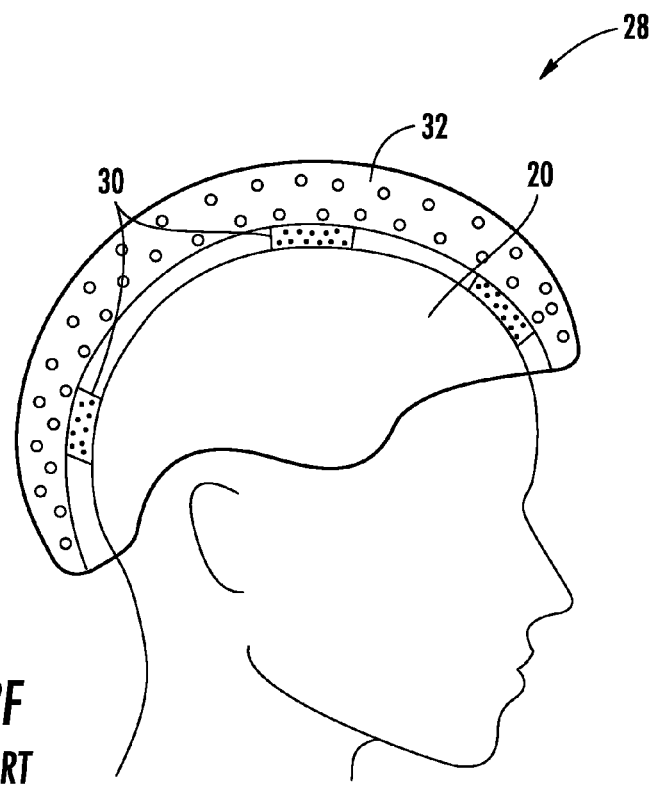

The characteristics and performance of the impact energy attenuation material 10 is best described in connection with its use in an actual application. For example, the material 10 may be used for a number of applications, such as body protection, in the form of a helmet to replace the conventional prior art constructions seen in FIGS. 2a-f. FIGS. 2a-b show a prior art strap suspension configuration 14 with straps 16 and shell 18 to rest on the head 20 while FIGS. 2c-d shows a unitary layer of foam padding configuration 22 with foam padding 24 between the shell 18 and the head 20. Additional fixed layers 26 are also commonly provided. FIGS. 2e-f further shows another embodiment 28 with intermittent swatches of padding 30 between the user's head 20 the outer shell 32. These prior art configurations provide inferior impact energy attenuation.

Figure 5:
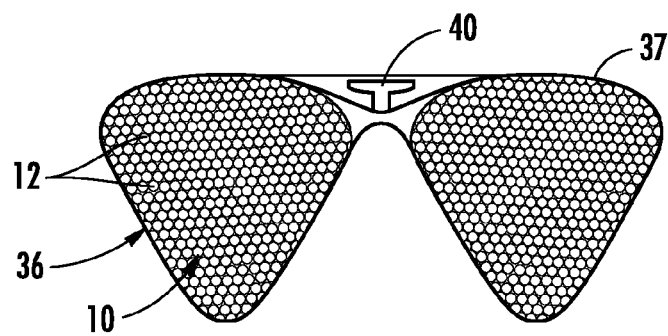
FIG. 5 is a cross-section view through the line 5-5 of FIG. 3.
Figure 4:
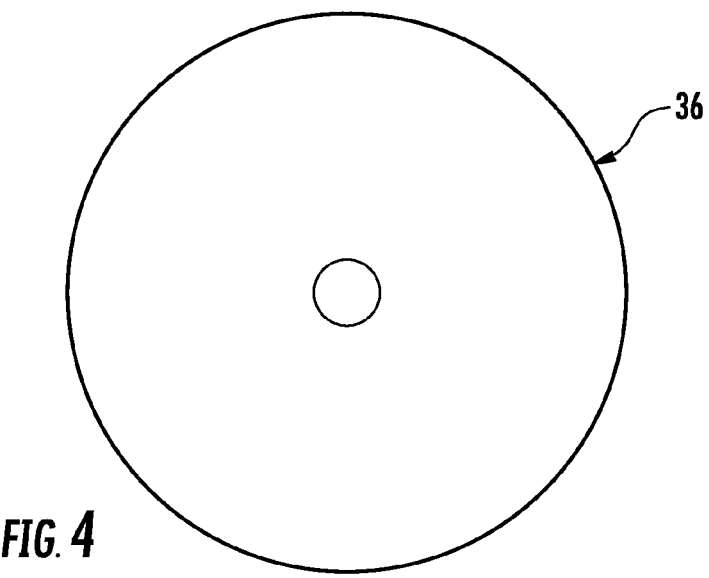
FIG. 4 is a bottom view of the impact energy attenuation module of the present invention.
Figure 3:
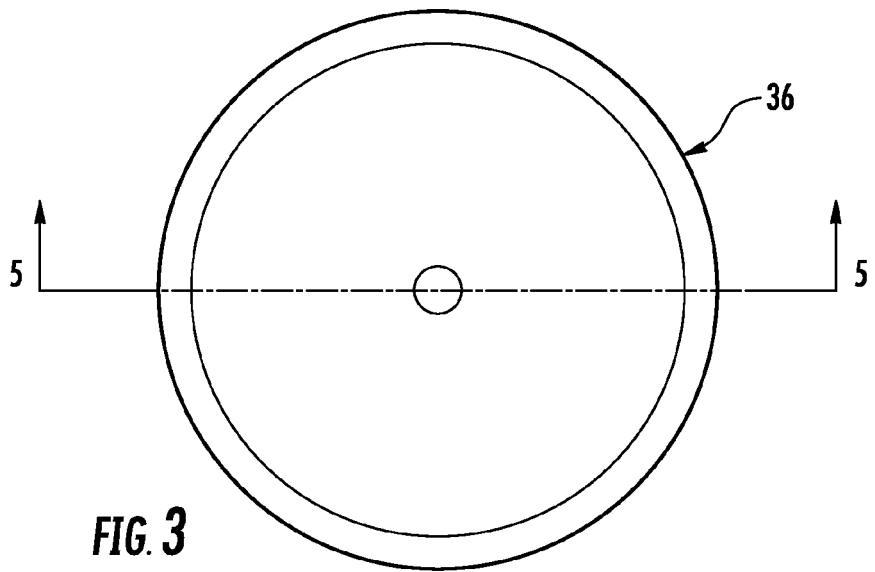
FIG. 3 is a top view of the impact energy attenuation module of the present invention.
Figure 6:
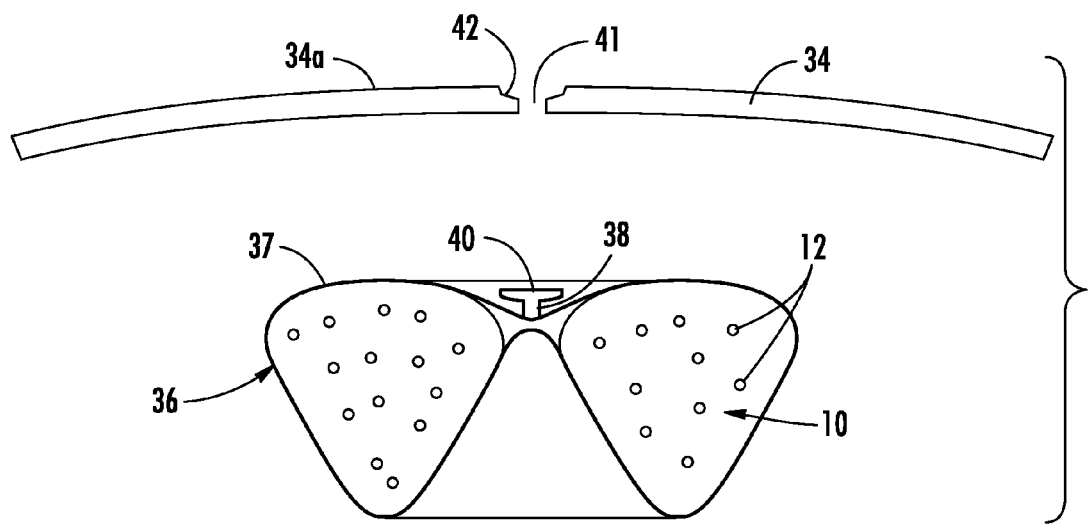
FIG. 6 is a cross-sectional view of the impact energy attenuation module being installed into a rigid outer shell.
Figure 7:
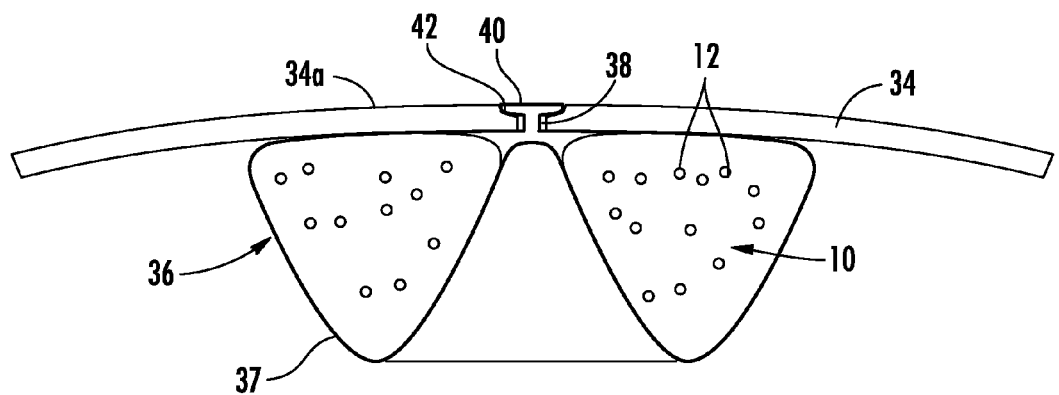
FIG. 7 is a cross-sectional view of the impact energy attenuation module installed into a rigid outer shell.

Referring back to the present invention, as in FIGS. 6 and 7, the system includes a rigid outer shell 34 with an impact energy attenuation module 36 removably attached thereto. The module 36 includes impact dissipation material 10 with particles 12 that may be encapsulated in a multiplicity of containers 37 installed to hold the object to be protected in suspension. The containers 37 are preferably in the form of a sealed bladder. Further details of the interconnection of the container 37 to the rigid outer shell 34 is shown in FIGS. 3-9. More specifically, FIG. 3 shows a top view of the container 36 while FIG. 4 shows a bottom view thereof. FIG. 5 is a cross-sectional view through the line 5-5 of FIG. 3 to illustrate the impact energy attenuation module 36 with a container 37 of a torus shape with material 10, including the loose particles 12, residing therein.

As can be seen in FIGS. 6 and 7, the impact energy attenuation module 36 of the present invention is removably affixed to the rigid outer shell 34. For example, a post 38 and button 40 is preferably provided to engage with an aperture 42 in the rigid outer shell 34. As in FIG. 7, it can be seen that the button 40 passes through the aperture 40 to secure the impact energy attenuation module 36 in place. A seat 42 may also be provided on the opposing side of the rigid outer shell 34 so that the button 40 of the impact energy attenuation module 36 lies flush with the outer surface 34a of the rigid outer shell 34. As will be described in detail below, to achieve the proper fit of irregular objects within a rigid shell 34, impact energy attenuation modules 36 of various dimension and density can be interchangeably attached to the interior of the shell 34.

Figure 8:
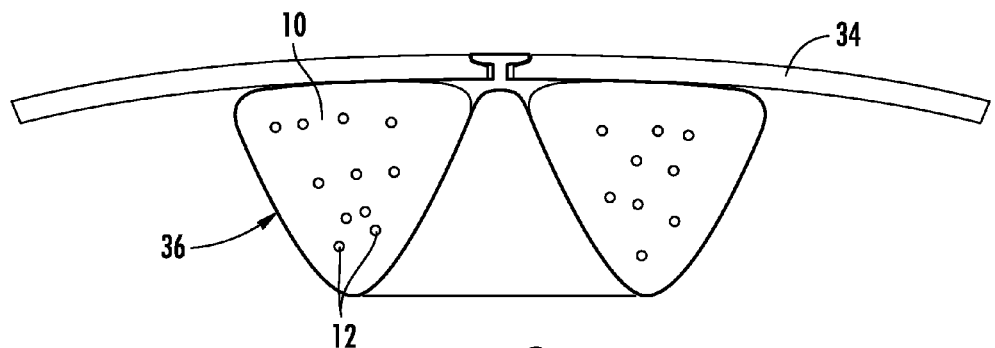
FIG. 8 is a cross-sectional view of the impact energy attenuation module in a neutral loaded condition.
Figure 9:
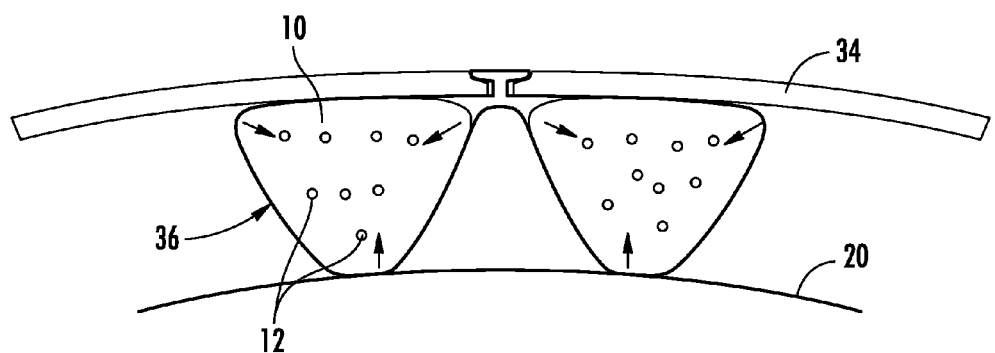
FIG. 9 is a cross-sectional view of the impact energy attenuation module in an in-use loaded condition.

Turning now to FIGS. 8 and 9, it can be seen that positive pressure can be achieved by loading or partially compressing each impact energy attenuation module 36 with the object to be protected, such as a head 20, in this example. More specifically, FIG. 8 illustrates the mounted impact energy attenuation module 36 in a neutral or unloaded condition. The torus-shaped impact energy attenuation module 36, filled with the impact energy attenuating material of loose particles 12 in a container 37, remains in a fully formed shape. This is in contrast to FIG. 9 which shows loading of the impact energy attenuation module 36, namely by communication of a bottom impact surface 20 (e.g. a person's head) and the rigid outer shell 34. The impact energy attenuation module 36, deforms when presented with this impact surface.

It should be noted that when used without a rigid outer shell 34, the impact dissipation material 10 with particles 12 may be encapsulated by a container 37 or containers 37 and held against the object to be protected or the threat object, such as a ski lift pole, steering wheel, and the like, by any number of conventional means, including fasteners, straps, hook and loop material, or integrated into an article of clothing or equipment, and the like. As when used with a shell 34, an equal positive pressure on the object to be protected should be achieved, although this is not required.

The inertial energy associated with a linear impact compresses the material 10 of particles 12, as can be seen by the arrows in FIG. 9. This initial phase of an impact, is, for example, typically 2-200 msec but could also be longer or shorter depending on the application. In accordance with the present invention, the inefficiency of the spherical, high friction material 10 translates a portion of the impact energy into heat. Referring back to FIG. 1, such translation of heat can be seen by the interaction of particles 12 relative to each other. The next phase of a typical impact surrounds the event of "peak load". During a peak load that exceeds the material's ability to translate that energy into heat through friction, the force "bottoms out" against a broader but thinner area of the loose particles 12. With this invention, a further degree of energy dissipation is provided by the elastomeric nature of the loose particles 12—through friction within the elastomeric material. The next phase of a typical impact is the translation of the remaining energy through to the object 20 to be protected. The final phase in the cycle of a typical impact is the duration to "reset" the material 10 for subsequent impacts. This reset typically occurs in the range of 50 milliseconds to approximately 5 seconds but this reset time could be shorter or longer. This process to bring the loose particles 12 back into a neutral state is accomplished by the material 10 and in this "rebound", the nature of the material 10 of loose particles 12 mitigates the negative affects associated with stored energy or spring back.

Figure 10:
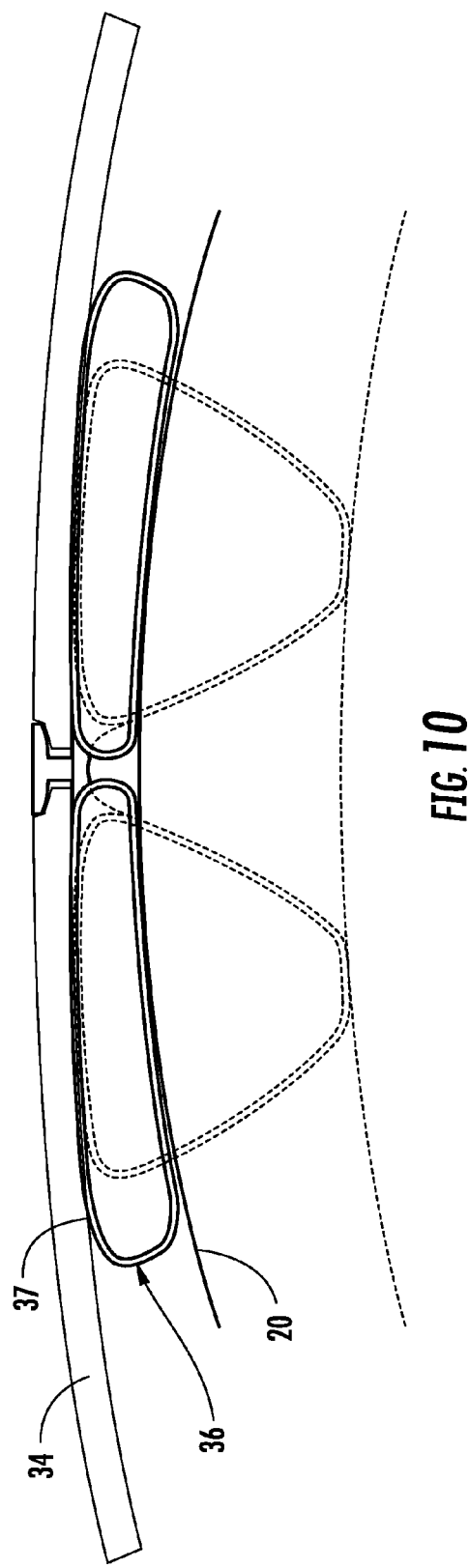
FIG. 10 is a cross-sectional view of the impact energy attenuation module under a peak load condition.

FIG. 10 illustrates an impact that is primarily linear, or "on axis" to the object to be protected. In this case, the impact dissipation material 10 reduces the likelihood of damage in at least two ways. First by translating a portion of the impact energy into heat and secondly by diffusing the energy across an area larger than the initial impact. In this case and during a "peak load" phase, the nature of the loose particle material 10, with its loose particles 12, will create an even load across the surface of the container 37 of the impact energy attenuation module 36.

Figure 11:
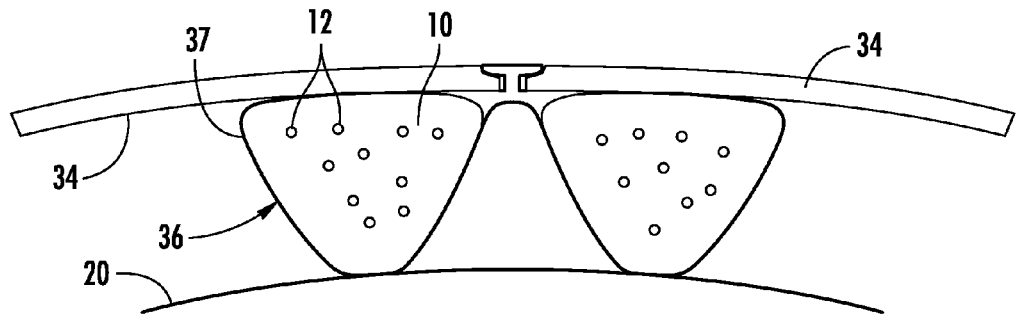
FIG. 11 is a cross-sectional view of the impact energy attenuation module in an in-use preloaded condition.
Figure 12:
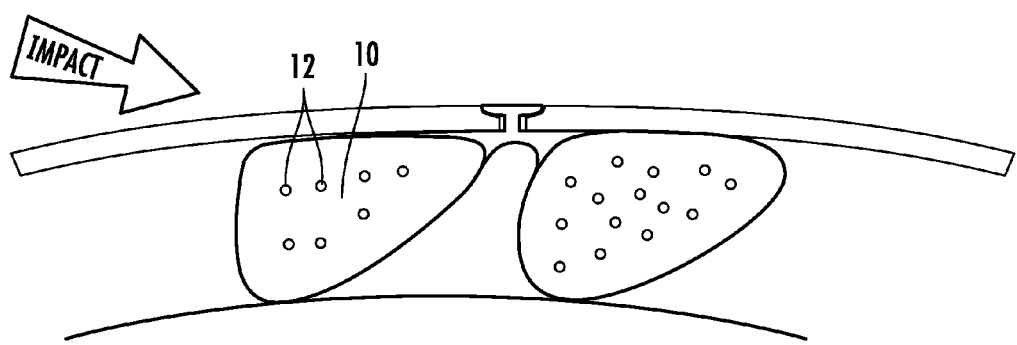
FIG. 12 is a cross-sectional view of the impact energy attenuation module under an off-axis impact load condition.

In contrast, during impacts that are primarily rotational, shear or "off axis" to the object to be protected, the impact dissipation material 10 reduces the likelihood of damage by freely shifting under the force, thus preventing that energy from entering the system. Such a condition can be seen in FIGS. 11 and 12. FIG. 11 illustrates pre-loading of the impact energy attenuation module 36 between the impact surface and the rigid shell 34. FIG. 12 shows the impact energy attenuation module 36 under an off-axis load resulting from an off-axis impact to the outer rigid shell 34. In this case, the impact energy attenuation module 36 conforms to improve impact energy attenuation.

Figure 13:
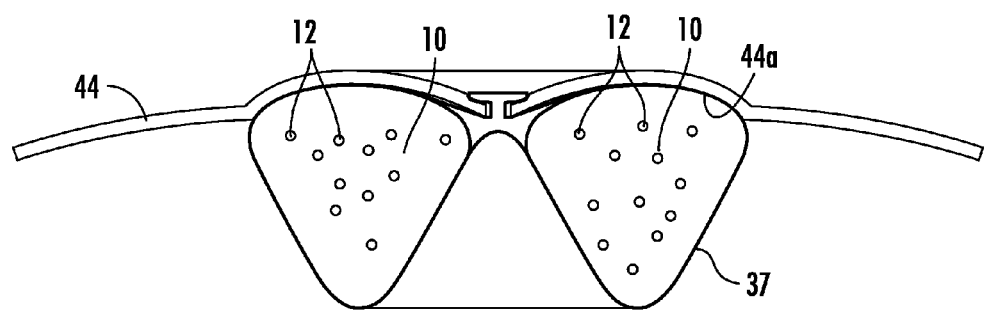
FIG. 13 is an alternative embodiment of the impact energy attenuation module and shell with a recess in the inner surface of the shell.
Figure 14:
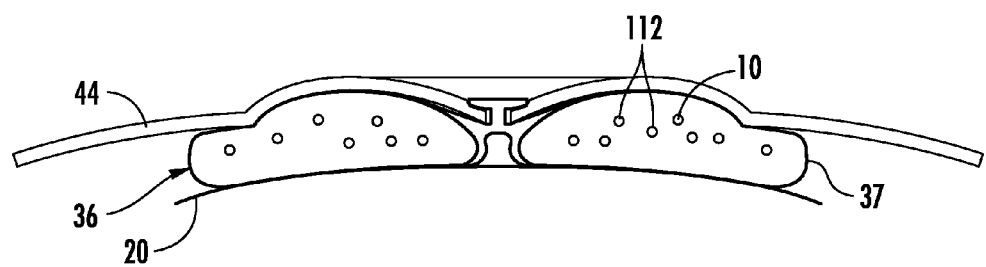
FIG. 14 is the alternative embodiment of FIG. 13 under an impact load.

Another example of a rigid shell and pad configuration is shown in FIGS. 13 and 14. In this embodiment, the rigid outer shell 44 includes a torus-shaped seat 44a to received the torus-shaped impact energy attenuation module 36. FIG. 13 shows this configuration at rest while FIG. 14 shows this configuration under impact load. In this case, as in FIG. 14, the impact energy attenuation module 36, namely the container portion 37, flexes outwardly to provide a particular profile that is suitable for certain environments.

Figure 15:
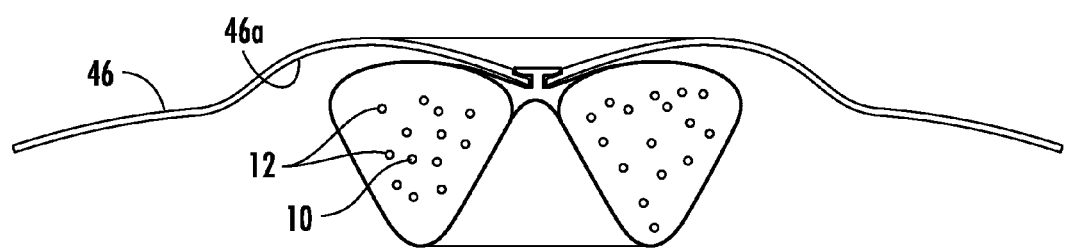
FIG. 15 is another alternative embodiment of the impact energy attenuation module and shell with a larger recess in the inner surface of the shell.
Figure 16:
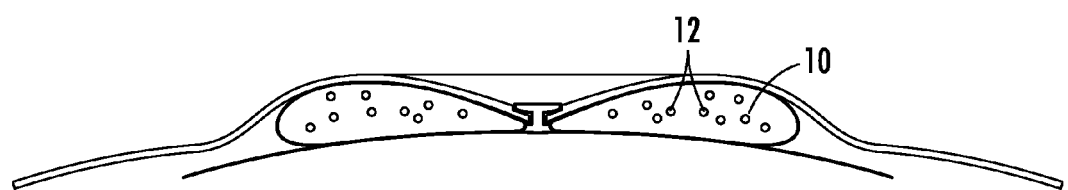
FIG. 16 is the alternative embodiment of FIG. 15 under an impact load.
Figure 17A:
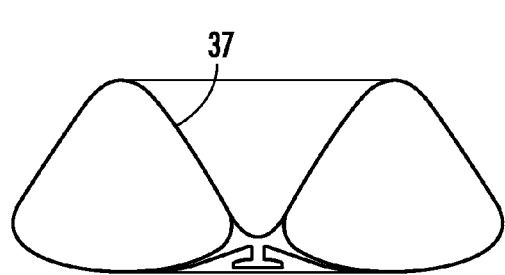
FIGS. 17a-h illustrate containers of differing heights and widths that can be used in a impact energy attenuation module in accordance with the present invention to hold particles of the present invention.
Figure 17B:
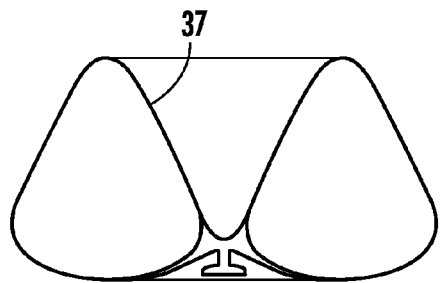
Figure 17C:
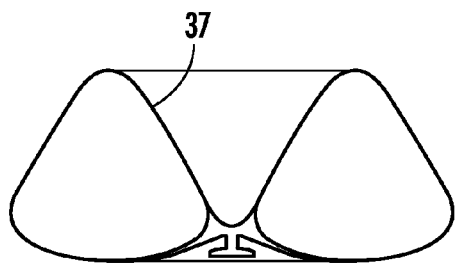
Figure 17D:
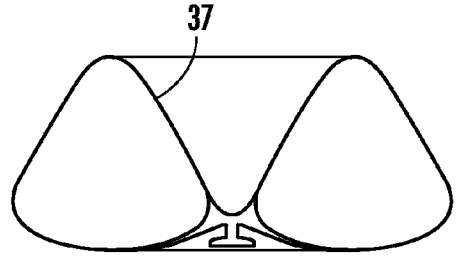
Figure 17E:
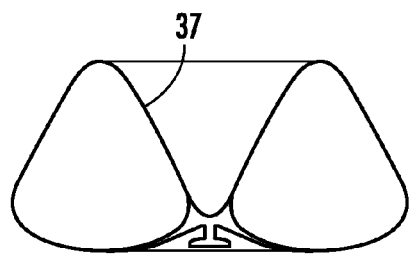
Figure 17F:
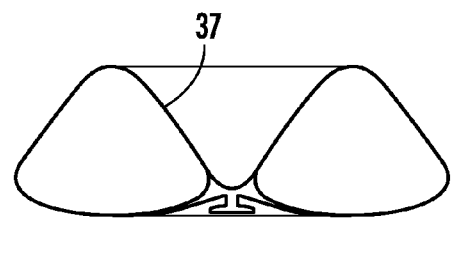
Figure 17G:
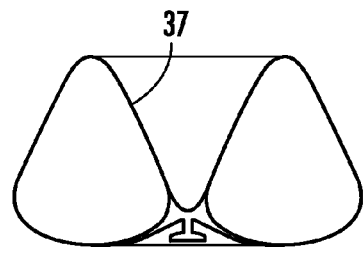
Figure 17H:
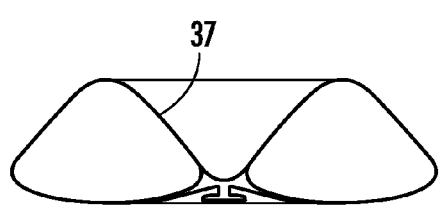

FIGS. 15 and 16 show yet another embodiment where the receiving seat 46a on the inner surface of the rigid shell 46 is larger than the width of the impact energy attenuation module 36 when at rest in the neutral position. As in FIG. 16, when the impact energy attenuation module 36 is under load, it remains contained within the boundaries of the receiving seat 46a. As above, this particular configuration may be more suitable for certain environments. These configurations can permit the impact energy attenuation module 36 to bottom out yet still maintain a relatively low profile of the overall shell 46.

Therefore, the impact energy attenuation modules 36 of different sizes and configurations of the present invention can be customized to achieve the proper fit of irregular objects within a rigid shell. As seen in FIGS. 6 and 7, discussed above, impact energy attenuation modules 36 of various dimension and density, with respective containers 37, can be removably attached to the interior of a shell to provide a custom fit and configuration for the user.

When used without a rigid outer shell 34, the impact dissipation material 10 may be encapsulated by a container 37 or containers 37 and held against the object to be protected or the threat object by any number of conventional means (fasteners, straps, hook and loop material, or integrated into an article of clothing or equipment, etc.) As when used with a shell 34, an equal positive pressure on the object to be protected should be achieved.

The size, shapes and configurations of the impact energy attenuation modules 36 and their respective containers 37 can be modified in any way to suit the application at hand. While a torus shape is preferred, any shape may be used and still be within the scope of the present invention. Also, a range of sizes of containers 37, such as varying in height and width, can be employed, as seen in FIGS. 17a-h. For ease of illustration, the impact energy attenuation material 10 is not shown in these figures.

Figure 18A:
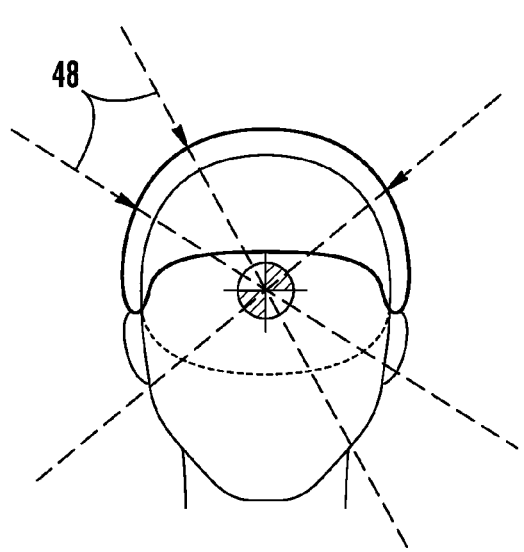
FIGS. 18a-d illustrate different angles of impact possible to the head.
Figure 18B:
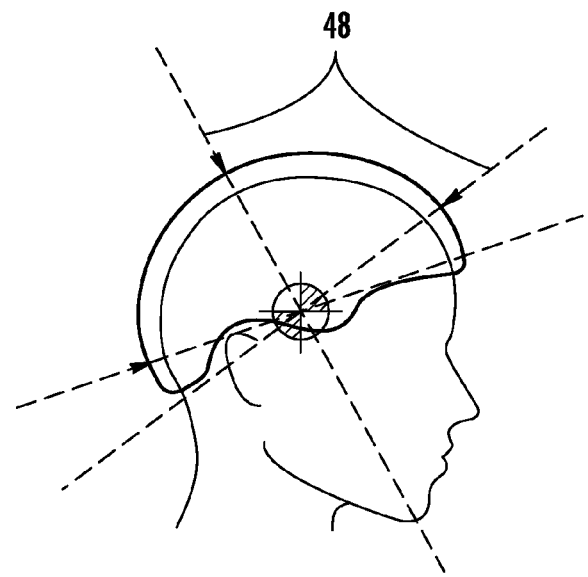

Turning now to FIGS. 18a-d, different angles of impact are shown to illustrate how the material 10 and impact energy attenuation module 36 can accommodate such angles of impact forces 48. FIGS. 18a and 18b illustrate an "on axis" or "linear" impact trajectory 48. During these on axis impacts 48 that are primarily linear, the impact energy attenuation module 36 reduces the likelihood of damage in at least two ways. First by bounding and guiding the loose particles 12 to translate a portion of the impact energy into heat and secondly by the nature of its triangular shape, diffusing the energy across an area larger than the initial impact. This load spreading can be best seen in FIG. 10. Also, during a "peak load" phase, the nature of the material 10 will further dissipate impact energy.

Figure 18C:
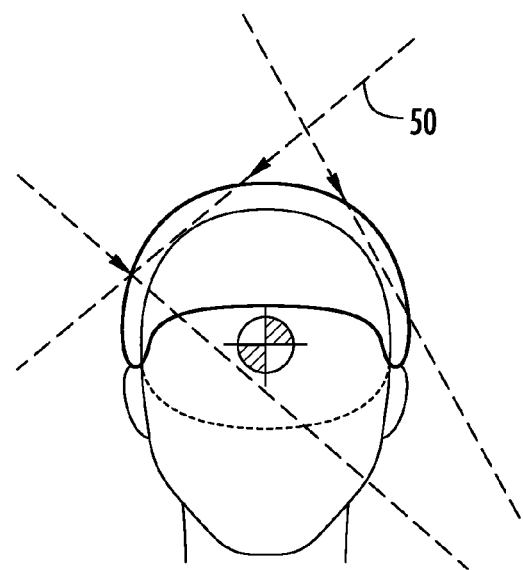
Figure 18D:
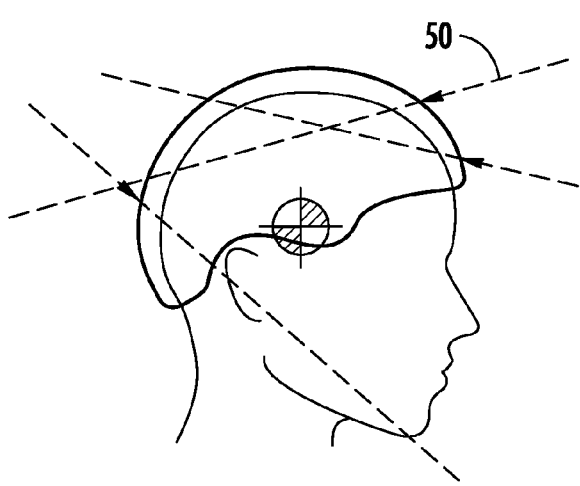
Figure 19:
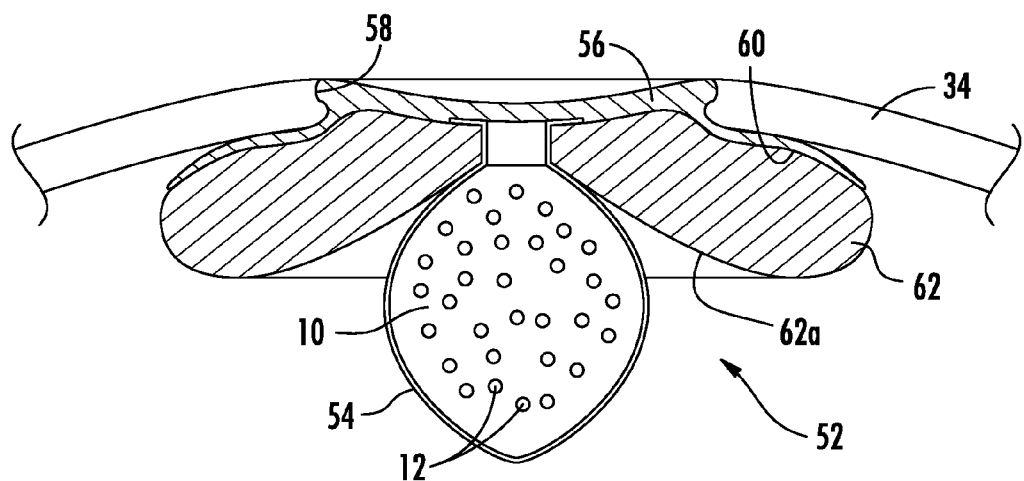
FIG. 19 is a cross-sectional view of the centered three-piece embodiment of the impact energy attenuation module installed on a rigid shell.
Figure 20:
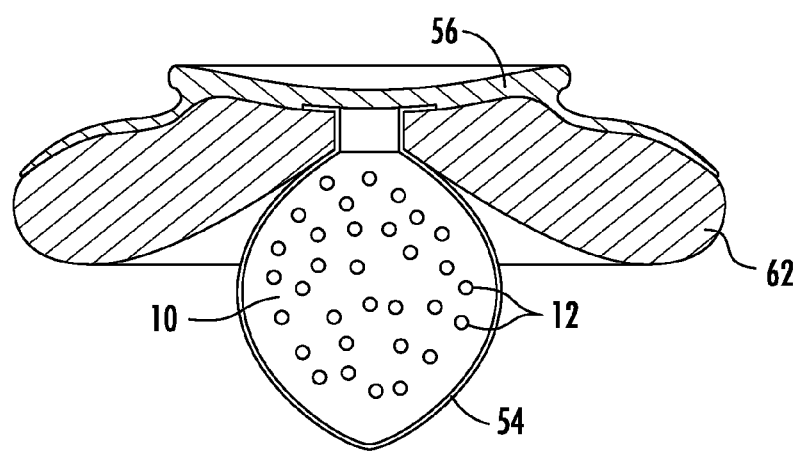
FIG. 20 is a cross-sectional view of the impact energy attenuation module of FIG. 19 isolated.
Figure 21:
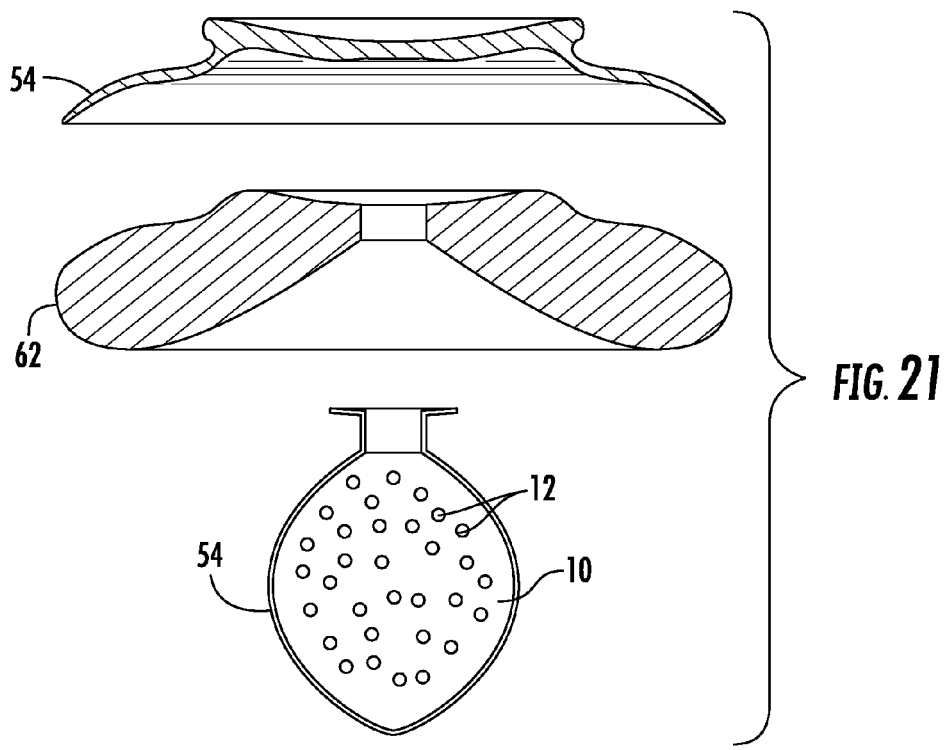
FIG. 21 is an exploded cross-section view of the impact energy attenuation module of FIG. 20.
Figure 22:
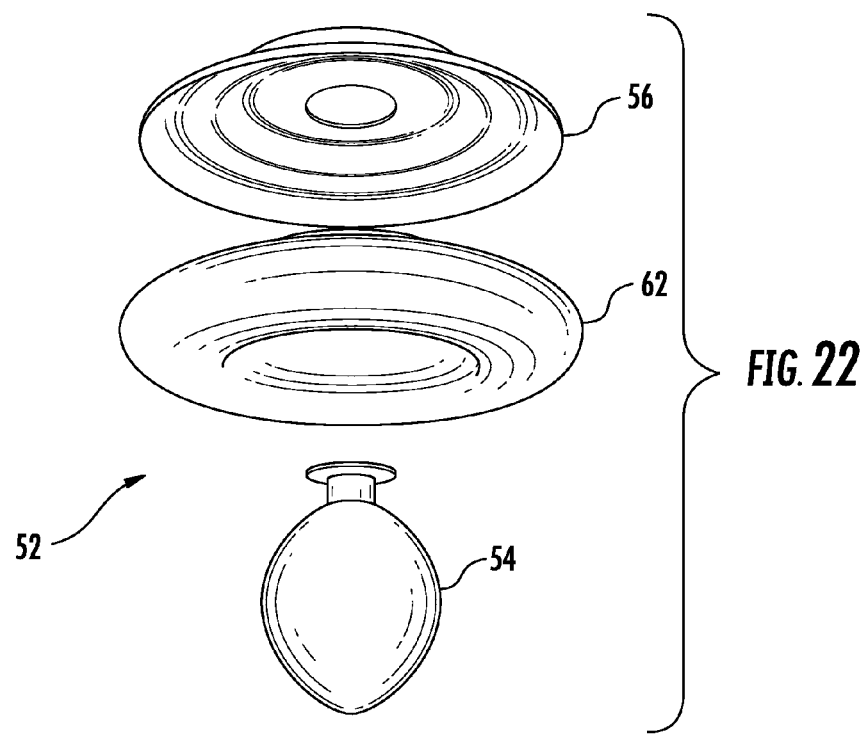
FIG. 22 is a perspective exploded view of the impact energy attenuation module of FIG. 21.

FIGS. 18c and 18d illustrate an "off axis" or "rotational" impact trajectory 50. During these impacts that are primarily rotational, shear or off axis to the object to be protected, the impact energy attenuation module 36 reduces the likelihood of damage by freely deforming under the force, preventing a portion of that energy from entering the system. This load spreading from a rotation impact trajectory can be seen in FIG. 12.

When implemented within a helmet, the nature of head shapes and sizes requires that the helmet be fitted to achieve maximum performance. In one embodiment, a fitter trained in the fitting process undertakes the customization of the shell to fit its user. A wide range of shells appropriate to many activities, such as cycling, contact sports, construction, and the like, will be available in sizes to fit most user's heads. A fitter trained in the fitting process will not only ensure compliance with safety standards, but adds value in the way of service. This process may occur in a specialty retail shop or in an institution where the staff can be trained. The fitting process may utilize a device that quickly determines the optimal location and pad sizes for a particular user's head. The fitter then installs the correct pads in the chosen shell and confirms the fit on the users head.

In another embodiment, a range of the sizes of the impact energy attenuation module 36 may be included with the shell 34 with instructions for the user to fit the helmet without assistance.

For applications where the space between the shell 34 and the object to be protected 20 is more consistent, a pre-determined set of impact energy attenuation modules 36 are preferably installed by an appropriate method.

For applications where no shell 34 will be used, impact energy attenuation modules 36 are preferably selected based on the likely impact forces to be encountered.

The impact energy attenuation module 36 may also be modified, in accordance with the present invention to include a three-piece configuration 52 for even further improved impact energy attenuation. Referring to FIGS. 19-23, a centered version includes a cross-sectional view of the three-piece configuration 52 is shown to include a central elongated spherical container 54 that serves as an impact energy focusing structure, which contains the material 10 of loose particles 12, as described above. The spherical container 54 is preferably permanently attached to a base member 56. The base 56 in this three-piece embodiment 52 creates a mechanical connection with the rigid shell 34 by engaging through an aperture 58 therein. It also serves to provide a degree of impact energy attenuation by means of the reverse camber surface 60 to which the energy attenuating components are attached. Furthermore, upon a high energy impact, the base 56 acts to hold the parts together which might otherwise fracture and disperse. FIGS. 23*a-d* illustrates, in steps, how the centered three-piece configuration 52 attenuates impact energy ranging from no load in FIG. 23*a* to an initial load in FIG. 23*b* to a partial load in FIG. 23*c* to a fully loaded pad in FIG. 23*d*. The compression and movement of spherical container 54 and intermediate member 62 can be seen.

Residing between the base member 56 and the spherical container 54 is a preferably torus-shaped element 62, which preferably is of a molded foam, such as EPS, EPP or any of the many foam materials known in the art. The torus-shaped element 62 is also preferably permanently attached to the base 56, such as by gluing, overmolding or any other method of affixation. This inner surface 62*a* of the torus-shaped element 62 faces toward and is adjacent to the spherical container 54 with loose particles 12 therein. Its shape is configured to enhance the energy focusing aspect of the spherical container 54 with loose particles 12, further directing impact energy.

A non-centered or offset version 64 of the three-piece impact energy attenuation module is shown in FIGS. 24-27. The functionality of this offset impact energy attenuation module 64 provides functionally that is identical to the "centered" version 52 of the impact energy attenuation module of FIGS. 19-23 with the exception of fit. A spherical container 66 intermediate member 68 and base 70 are provided in similar fashion to the centered version 52. This offset configuration 64 allows a user to fine tune the fit of each impact energy attenuation module 64 in a helmet (represented by a shell 34) by rotating it circularly within the mechanical connection to the shell or liner 34. FIGS. 25*a-e* show the non-centered or offset version 64 and how it can be rotated for custom fit to position the spherical container 66 where desired.

Figure 25A:
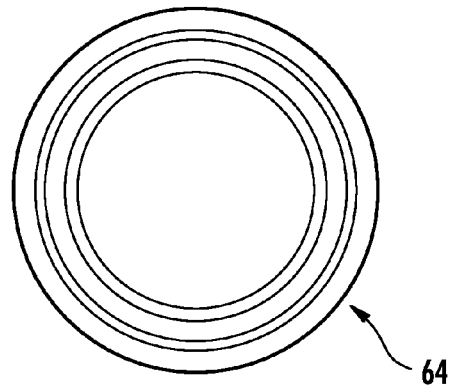
FIG. 25a-e show the impact energy attenuation module of FIG. 24.
Figure 25B:
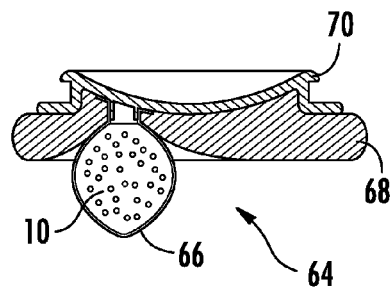
Figure 25C:
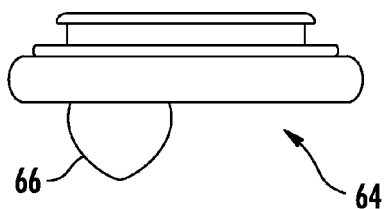
Figure 25D:
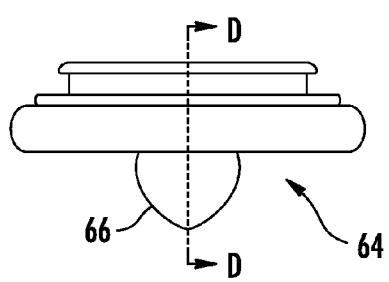
Figure 26:
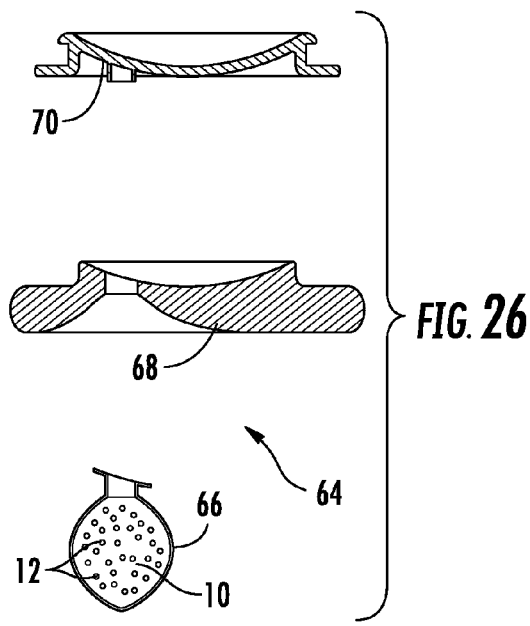
FIG. 26 is an exploded cross section view of the impact energy attenuation module of FIG. 24.
Figure 25E:
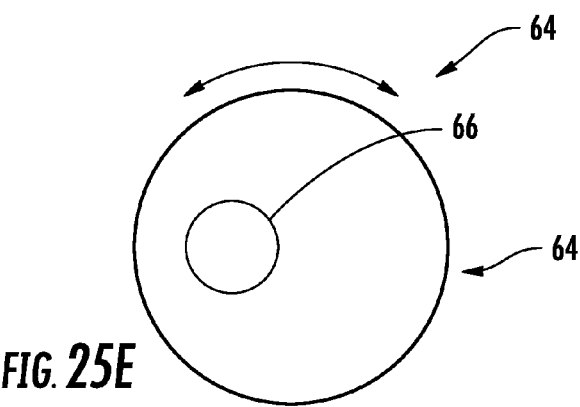
Figure 27A:
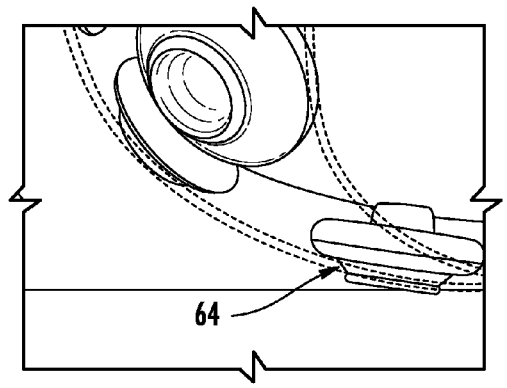
FIG. 27a-e is a perspective view of the off center three-piece impact energy attenuation module in different levels of load.
Figure 27B:
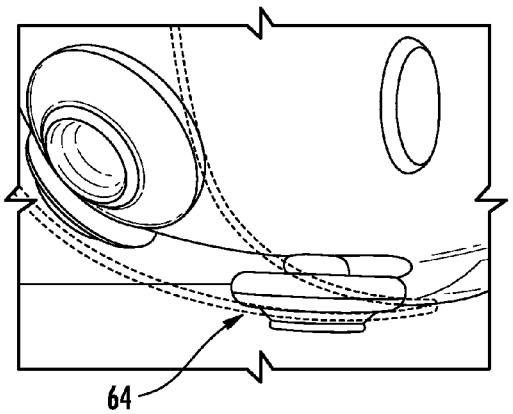
Figure 27C:
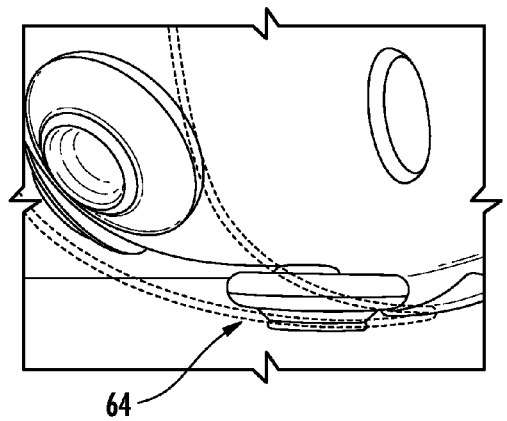
Figure 27D:
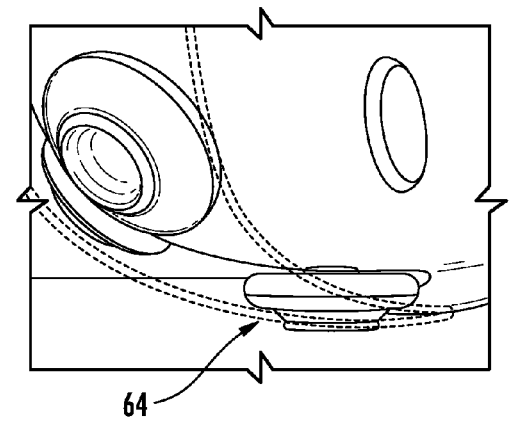
Figure 27E:
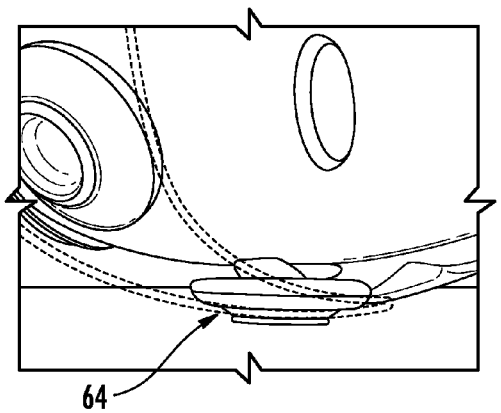
Figure 28A:
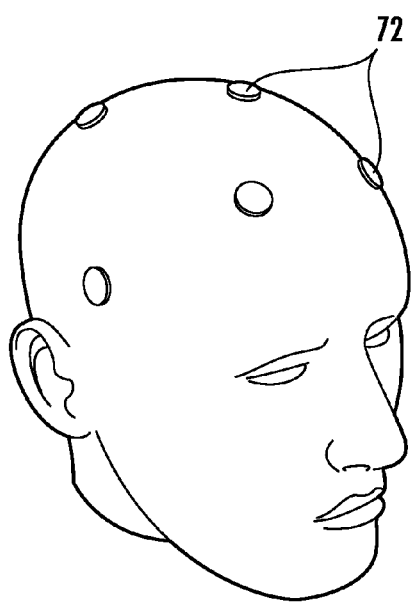
FIGS. 28a-d are perspective view of the matrix array of impact energy attenuation modules on an helmet.
Figure 28B:
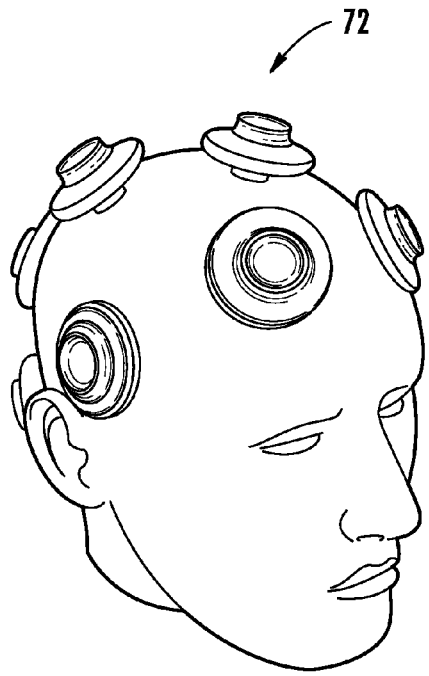
Figure 28C:
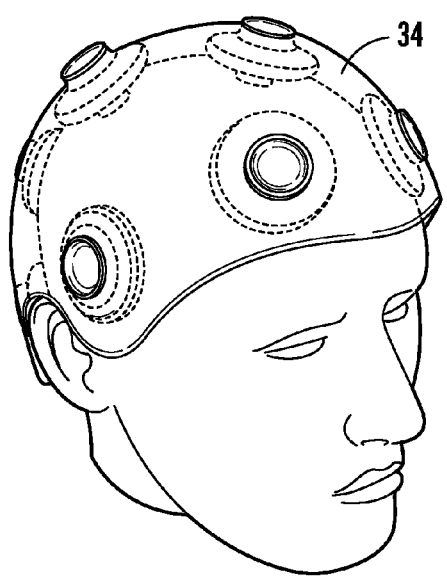
Figure 28D:
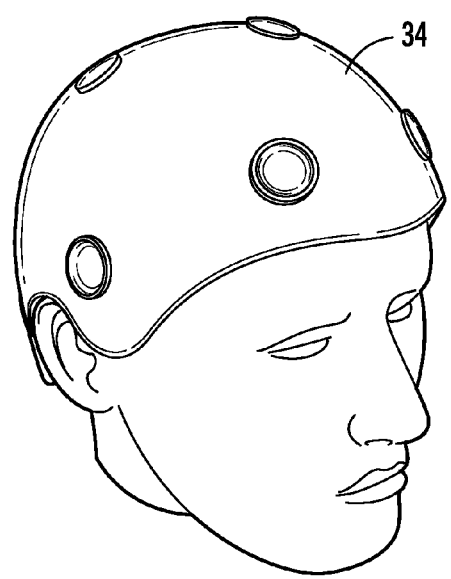

Depending on the distribution of the matrix within the shell or liner 34, any impact energy attenuation module 64 may align with a high point on the users head 20 (not shown in FIG. 24). If by turning the impact energy attenuation module 64, it may instead align with a lower point, the resulting increase in space may allow for a thicker and therefore higher energy attenuating impact energy attenuation module 64 to be installed. FIGS. 24 and 25*a* show the offset three-piece pad container 64 at rest. FIGS. 27*a-e* illustrates, in steps, how the offset non-centered three-piece configuration 64 attenuates impact energy ranging from no load in FIG. 27*a* to a fully loaded impact energy attenuation module 64 in FIG. 27*d*. FIG. 27*e* shows a deflected impact energy attenuation module 64 after bottoming out in FIG. 27*d*.

Figure 30B:
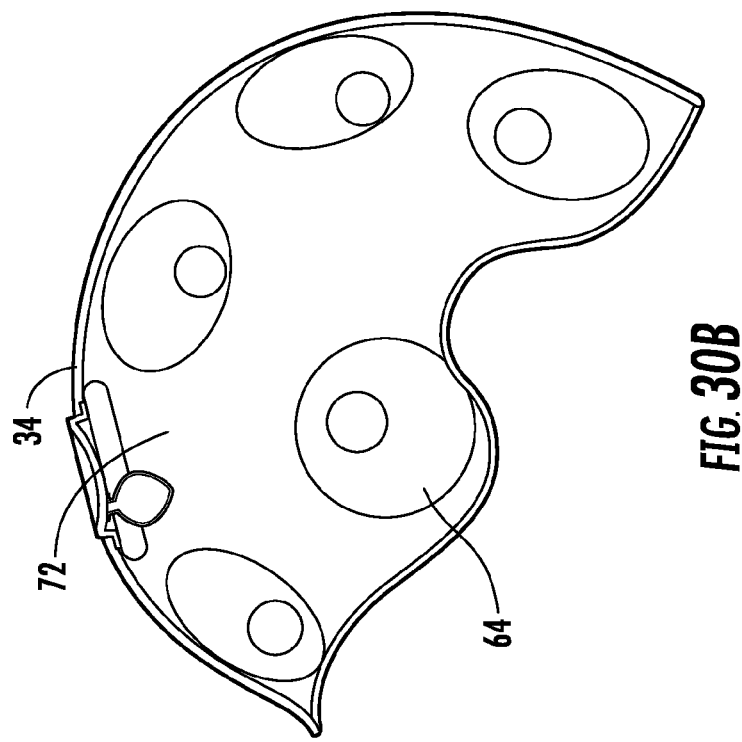
FIGS. 30a-b illustrate a front perspective and side view of a helmet with off center impact energy attenuation modules installed thereon.
Figure 30A:
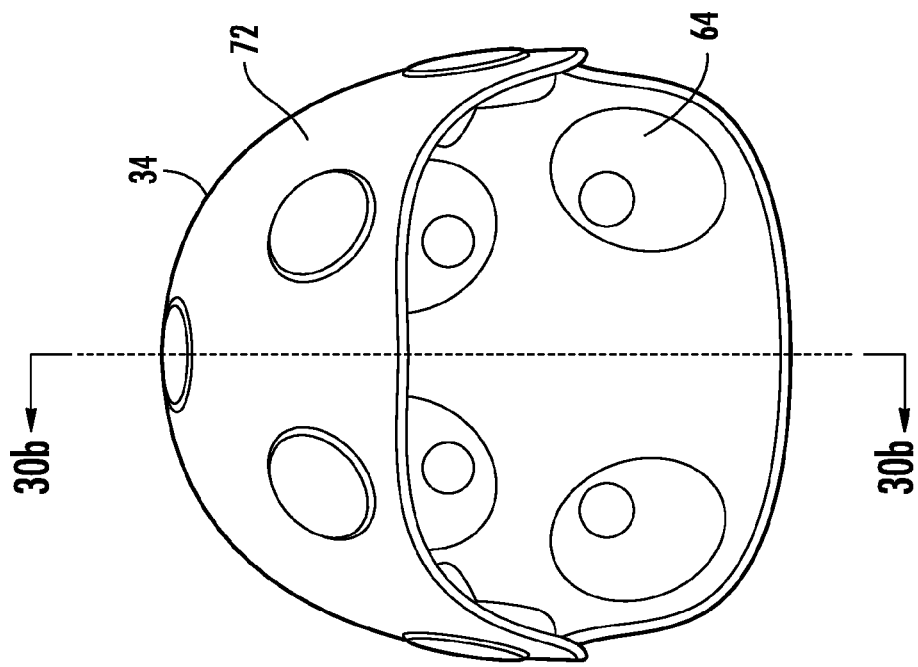

In this preferred embodiment, when installed in a rigid helmet shell or liner (see helmet assembly of FIGS. 6 and 7 for example) a plurality of impact energy attenuation modules 36, 52 and/or 64 preferably form a passive matrix 72, as illustrated in FIGS. 28*a-d*. As in FIGS. 28*c-d*, the rigid shell 34 distributes some of the total impact energy to each of the impact energy attenuation modules surrounding the locus of impact. The appropriate centered and/or non-centered pads 36, 52 and/or 64 are selectively used for a custom fit. For example, FIGS. 29*a-b* illustrate the mounting of a centered three-piece pad impact energy attenuation module 52 installed within a desired matrix 72 of pad affixed to the rigid shell 34. Similarly, FIGS. 30*a-b* illustrate the mounting of a non-centered/offset three-piece impact energy attenuation module 64 installed within a desired matrix 72 of impact energy attenuation modules 64 affixed to the rigid shell 34.

In lower energy impacts, the loose particle container 54, 66 is engaged then immediately returns to its original shape and position. In higher energy impacts, the loose particle container 54, 66 is initially engaged through its peak capacity. Upon bottoming out, the impact energy then engages the torus shaped foam module 62, 68, which in this preferred embodiment has a higher threshold of energy attenuation. With sufficient impact energy, the inherent attenuation qualities of the loose particles 12 of the material 10 as well as the reverse camber of the base module 56, 70 are engaged as well.

Another important aspect of the present invention is the ability to fine tune the performance characteristics and fit of an impact system. In that connection, the invention enables individual impact energy attenuation modules in an impact system to be adjusted to align with the anatomy of the user. Thus, the invention enables any single impact energy attenuation module in the system to dissipate impact energy both in tension and compression.

When implemented in a helmet, such as in the form of a shell 34 as in FIGS. 6 and 7, the nature of head shapes and sizes requires that the helmet, i.e. the shell 34, be fitted to achieve maximum performance. A wide range of shells 34 appropriate to many activities, such as cycling, contact sports, construction, and the like, are available in sizes to fit most user's heads 20.

Figure 31C:
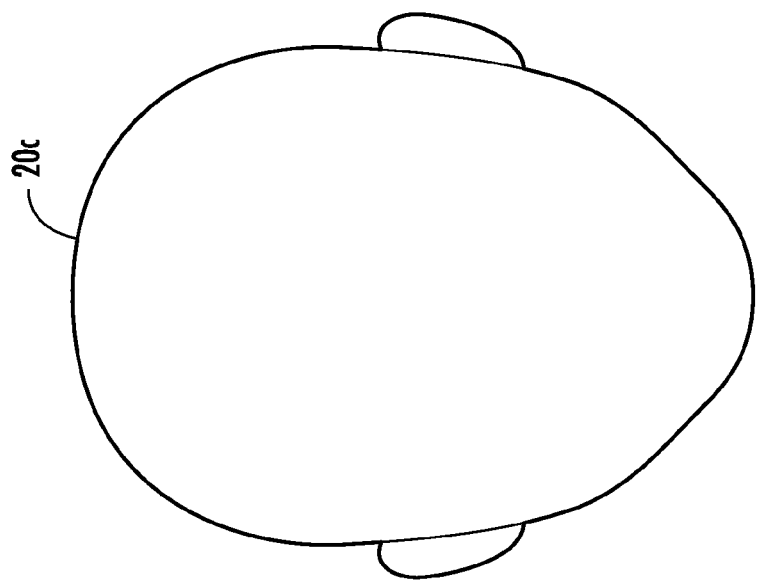
FIGS. 31a-c illustrate heads of different sizes.
Figure 31B:
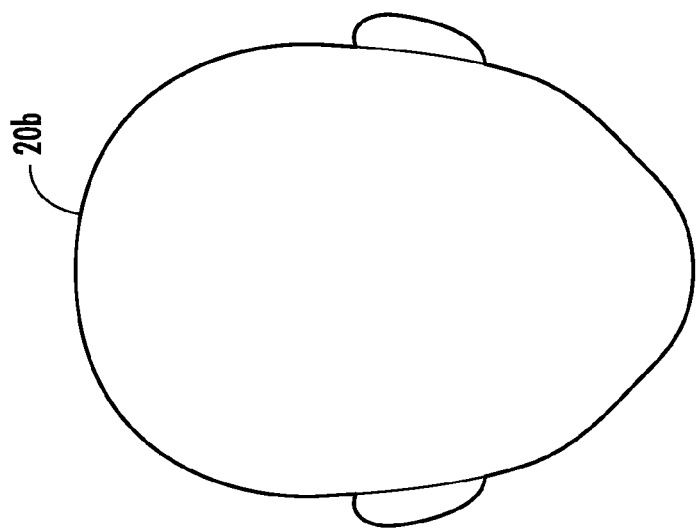
Figure 31A:
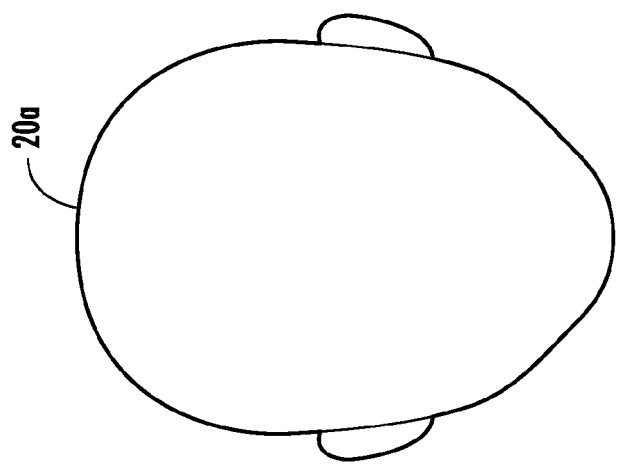
Figure 32C:
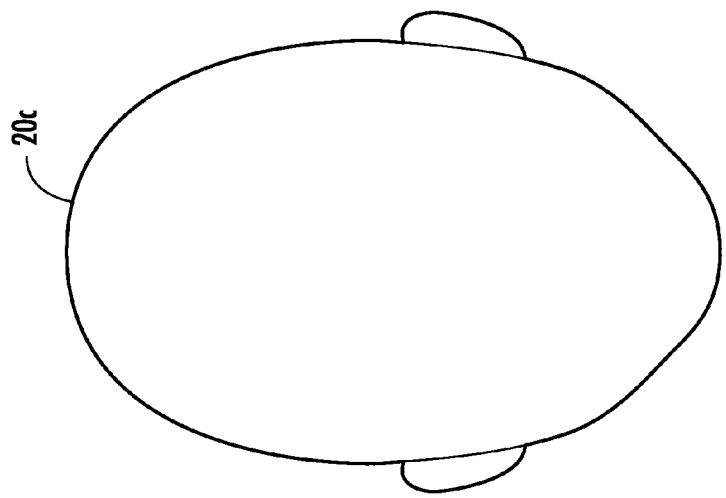
FIGS. 32a-c illustrates heads of different shapes.
Figure 32B:
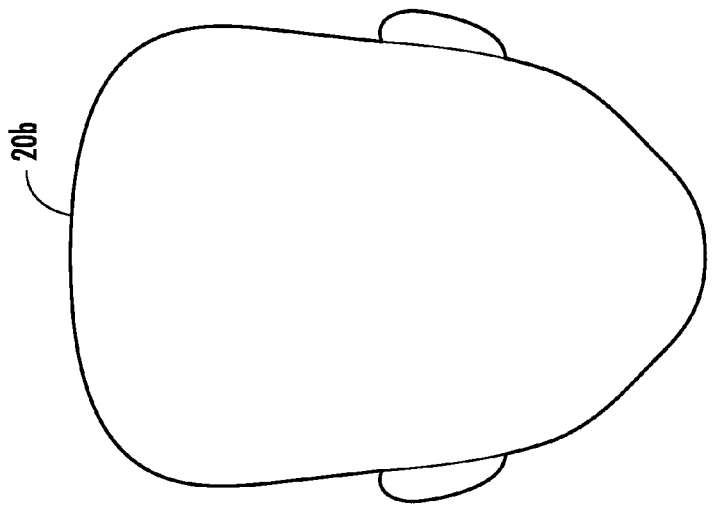
Figure 32A:
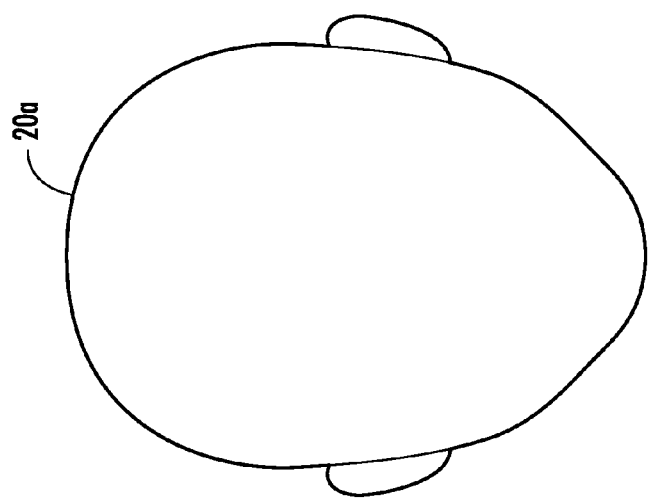

First, a rigid shell type is selected based on the intended use—for example, bicycle, football, baseball, hockey, and the like, then a particular style within that type and finally a size suited to the users head size, as see in FIGS. 31*a-c*, and shape, as seen in FIGS. 32*a-c*. Because the range of actual head shapes 20*a-c* and sizes varies considerably from the head form used to manufacture a shell 34, there will be some void between the users head 20*a-c* and the inner surface of the shell 34, and that void will be inconsistent. While several solutions have been identified to address this issue, as in prior art FIGS. 2*a-f*, none except a custom fitted product reduce the void spaces with impact dissipating material 10. To address this need, the present invention provides a shell 34 with a plurality of connection points on the interior surface, which may include mechanical fasteners, hook and loop, adhesive or the button aperture interconnection, shown in FIGS. 6 and 7.

Once a shell 34 is selected, impact energy attenuation modules 36, 52 and/or 64, as seen in FIGS. 3-5 and FIGS. 20 and 24, of a particular thickness, are selected from an array of different sizes and shapes, as in FIG. 17, to ensure a proper fit to the users head. Each impact energy attenuation module, when installed in the system is preferably compressed 10-25% by height when fitted to the users head 20 to ensure maximum energy dissipation efficiency, as illustrated in FIGS. 8 and 9. Such compression is just an example of the extent of compression for this particular example. Different particles 12 with different impact energy attenuation module structures in different environments may achieve compression that is more or less than the compression indicated above.

To further ensure the system is suited to the intended use, impact energy attenuation modules of a particular density and surface area are selected based on risk factors such as weight of user, likely velocities, and types of impacts. Larger area and higher density impact energy attenuation modules are selected for heavier users with higher risk factors and smaller, lower density impact energy attenuation modules are selected to lighter users with lower risk factors.

A final aspect of fit involves aligning impact energy attenuation modules with specific anatomic structures of the users skull 20 to direct the flow of impact energy into inherently stronger and less vulnerable areas of the users body. As in FIGS. 33a-d, preferably nine points, in a matrix 72, on the skull 20 have been identified as individually optimal for strength as well as for creation of a matrix 72 with a high ratio of energy dissipation to physical structure. Of course, more or less than nine points may be employed and still be within the scope of the present invention.

To adjust the fit of a helmet, namely a shell 34, to the users head 20, the fitter further refines the impact energy attenuation module selection to ensure that each impact energy attenuation module in the system is evenly loaded or partially compressed against the users head 20 once installed in the shell 34. The space between the users head 20 and the inside of the shell 34 is used to determine each impact energy attenuation module's thickness. The effect of this fitting will ensure a comfortable, safe helmet.

The fitting process may utilize a specialized device that quickly determines the optimal location and impact energy attenuation module sizes for a particular user's head 20. The fitting process may utilize a specialized computer program to compile the collected data from the user to suggest specific impact energy attenuation modules for optimal fit.

Once the impact energy attenuation modules are selected, the impact energy attenuation modules are inserted into the chosen shell 34 to align with the users cranial structure. Any impact energy transmitted through the system to the users heads 20 should follow a path that reduces the potential for injury.

When used without a rigid outer shell 34, the impact energy attenuation modules will be held against the object to be protected or the threat object by any number of conventional means, such as by fasteners, straps, hook and loop material, or integrated into an article of clothing or equipment, and the like.

Figure 34A:
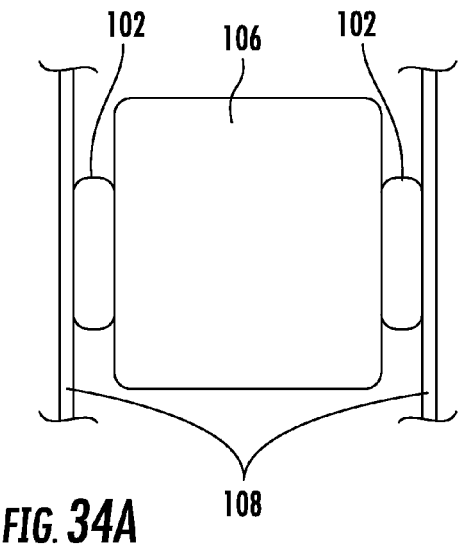
FIG. 34a-d illustrates the present invention used as both a compression and tension force dissipator.
Figure 34C:
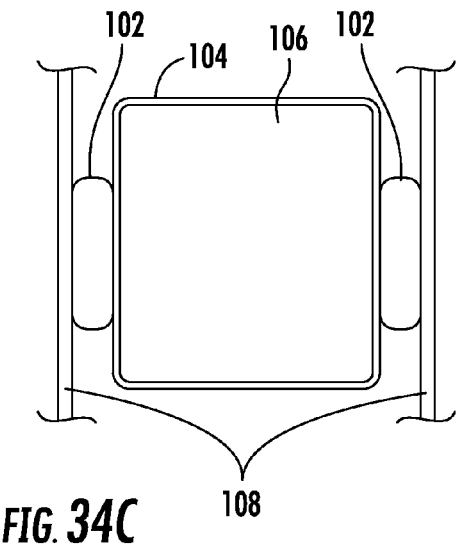
Figure 34B:
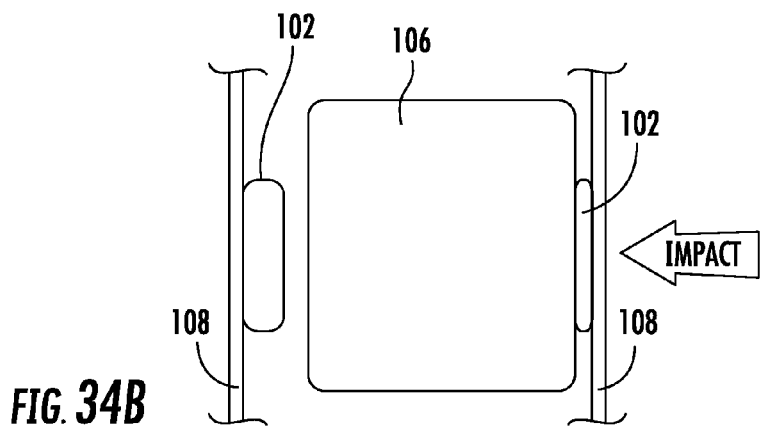
Figure 34D:
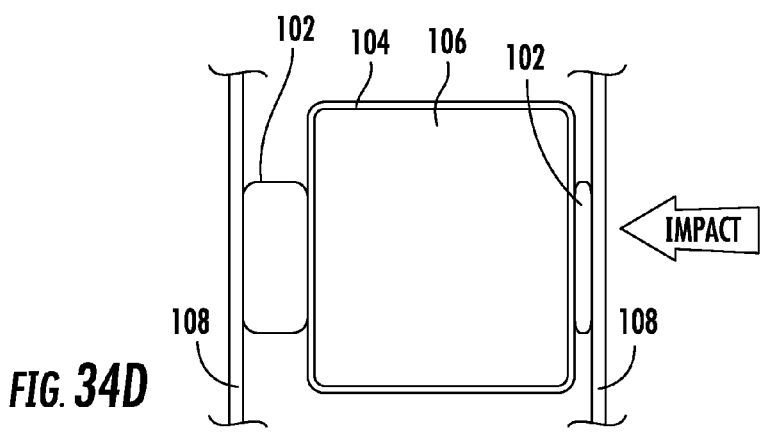

The embodiment of FIG. 34a-d illustrates an embodiment used as both a compression and tension force dissipater 100. To take full advantage of the inherent impact mitigation qualities of certain impact energy attenuation modules 102, similar to modules 36, 52 and/or 56, a harness 104 may or may not be added to a system that includes a rigid shell, as in FIGS. 34c and 34d. FIGS. 34a-b show this embodiment without a harness 104 while FIGS. 34c-d shows use of a harness 104. The harness 104 is intended to snugly fit the object to be protected 106. In this use, each impact energy attenuation module 102 in the system is attached both to the inside of the rigid shell 108, and the harness 104. Upon delivery of an impact, the harness 104, links the impact energy attenuation modules 102 actively so the compressive force on any particular impact energy attenuation module 102 is slowed by the tensile force on the opposite impact energy attenuation module 12. This concept can be applied to both single axis and multi axis applications.

It would be appreciated by those skilled in the art that various changes and modifications can be made to the illustrated embodiments without departing from the spirit of the present invention. All such modifications and changes are intended to be covered by the appended claims.

What is claimed is:

1. A material for attenuating the impact energy from an incoming impact force, sufficient enough to cause trauma to a body part, to prevent trauma to a body part, comprising:
   a plurality of particles configured and arranged within a volume of space; at least one of the plurality of particles capable of being in communication with an incoming impact force having an impact duration within a time range of approximately 2 milliseconds to approximately 5 seconds;
   whereby upon communication of the at least one of the plurality of particles with other ones of the plurality of particles within the volume of space due to an incoming impact force, the incoming impact force is attenuated via the other ones of the plurality of particles within the volume of space.

2. The material of claim 1, wherein the particles are spheroid.

3. The material of claim 1, wherein the particles are non-spheroid.

4. The material of claim 1, wherein the particles are made of a material selected from the group consisting of: plastic, glass and ceramic.

5. The material of claim 1, wherein the particles are solid.

6. The material of claim 1, wherein the particles are hollow.

7. The material of claim 1, wherein the particles have a diameter in the range of approximately 0.1 mm to approximately 3.0 mm.

8. The material of claim 1, wherein friction between the plurality of particles increase the efficacy of the non-linear energy attenuation.

9. The material of claim 1, wherein the plurality of particles have a durometer in the range of approximately Shore A 10 to approximately Shore A 100.

10. The material of claim 1, wherein the material resets to its original unloaded resting position and shape after an impact thereto within a time range of approximately 50 milliseconds to approximately 5 seconds in preparation for subsequent impact to avoid impact due to a subsequent incoming impact force to the body having a duration within the time range of 2 milliseconds to 5 seconds.

* * * * *